United States Patent
Song et al.

(10) Patent No.: US 10,338,731 B2
(45) Date of Patent: Jul. 2, 2019

(54) FINGERPRINT SENSOR INTEGRATED TYPE TOUCHSCREEN DEVICE

(71) Applicant: LG DISPLAY CO., LTD., Seoul (KR)

(72) Inventors: Moonbong Song, Seoul (KR); Kyoseop Choo, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/385,238

(22) Filed: Dec. 20, 2016

(65) Prior Publication Data

US 2017/0336909 A1 Nov. 23, 2017

(30) Foreign Application Priority Data

May 20, 2016 (KR) .................... 10-2016-0062159

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06K 9/00013* (2013.01); *G06F 2203/04106* (2013.01)

(58) Field of Classification Search
CPC ......... G06F 3/0416; G06F 2203/04106; G06F 3/044; G06F 3/041; G06K 9/00013
See application file for complete search history.

(56) References Cited

U.S. PATENT DOCUMENTS

| 8,564,314 | B2 | 10/2013 | Shaikh et al. | |
|---|---|---|---|---|
| 2008/0309631 | A1* | 12/2008 | Westerman | G06F 1/3203 345/173 |
| 2012/0105081 | A1* | 5/2012 | Shaikh | G06K 9/0002 324/686 |
| 2013/0279769 | A1 | 10/2013 | Benkley, III et al. | |
| 2013/0307818 | A1 | 11/2013 | Pope et al. | |
| 2015/0177884 | A1* | 6/2015 | Han | G06F 3/044 345/174 |
| 2016/0364593 | A1* | 12/2016 | Lee | G06F 3/0416 |
| 2017/0123555 | A1* | 5/2017 | Kim | G06K 9/0002 |
| 2018/0004999 | A1* | 1/2018 | Apostolos | G06K 9/0002 |

FOREIGN PATENT DOCUMENTS

KR 20140142370 A 12/2014

* cited by examiner

*Primary Examiner* — Md Saiful A Siddiqui
(74) *Attorney, Agent, or Firm* — Seed Intellectual Property Law Group LLP

(57) ABSTRACT

A fingerprint sensor integrated type touchscreen device comprises a sensor array comprising a touch sensor area with sensors, a fingerprint and touch sensor area with sensors, sensor lines connected to the sensors in the touch sensor area, and sensors lines connected to the sensors in the fingerprint and touch sensor area. At least some of the sensor lines connected to the sensors in the fingerprint and touch sensor area are separated from the sensor lines connected to the sensors in the touch sensor area.

19 Claims, 33 Drawing Sheets

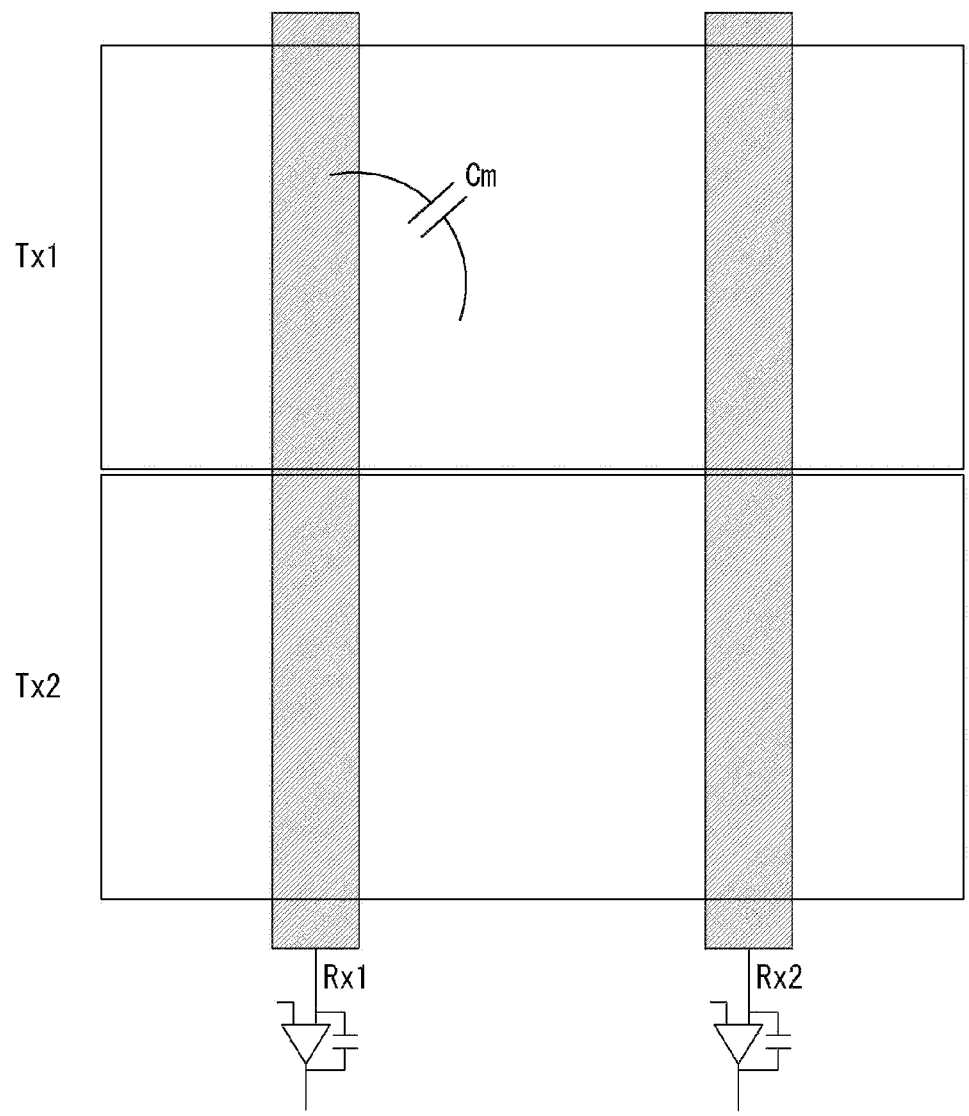

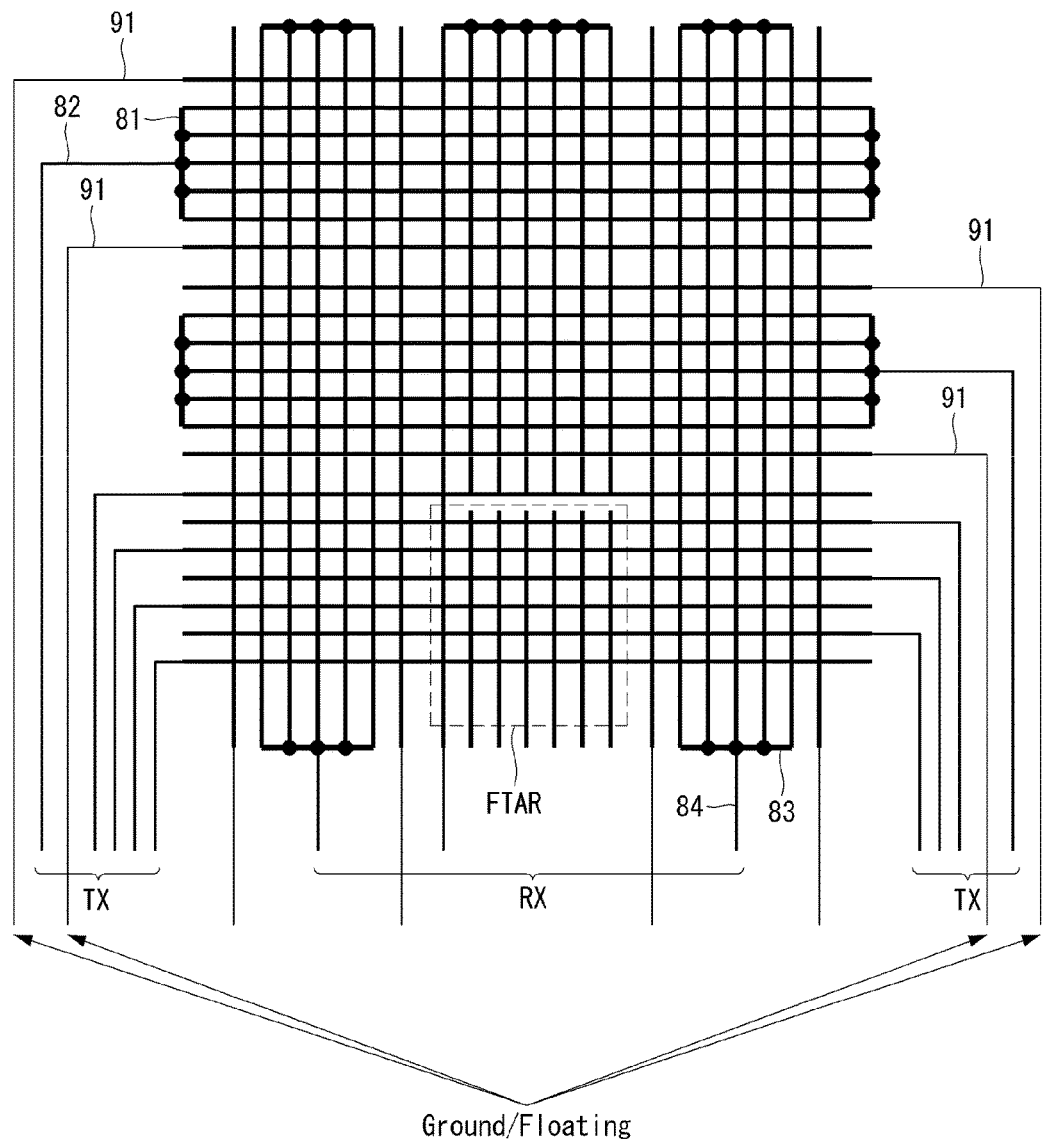

FINGERPRINT SENSOR INTEGRATED TYPE TOUCHSCREEN DEVICE

This application claims the priority benefit of Korean Patent Application No. 10-2016-0062159 filed May 20, 2016, which is incorporated herein by reference for all purposes as if fully set forth herein.

BACKGROUND

Technical Field

The present disclosure relates to a fingerprint sensor integrated type touchscreen device, and more particularly, to a touchscreen device having a fingerprint recognition function.

Discussion of the Related Art

With the advance of computer technology, computer-based systems for various purposes, such as laptop computers, table PCs, smartphones, personal digital assistants, automated teller machines, search guidance systems, etc., have been developed. Since these systems usually store a lot of confidential data such as business information or trade secrets, as well as personal information about the private lives of individuals, there is a need to strengthen security to protect this data.

Biometrics is the measurement of physiological characteristics typically used to identify specific users. Biometric information is information obtained directly from a human body, including fingerprint, iris scan, retina scan, hand geometry, facial recognition, etc. Behavioral biometrics include voice recognition, signature scan, etc. Voice, iris, retina, face, and fingerprint recognition technologies have already been developed and used for systems that take security seriously.

Fingerprint sensors for fingerprint recognition can generally be categorized into two types: optical fingerprint sensors and capacitive fingerprint sensors.

The optical fingerprint sensor scans a fingerprint by a light source such as LED (light-emitting diode) and detects the light reflected by the ridges of the fingerprint by a CMOS (complementary metal-oxide semiconductor) image sensor. The optical fingerprint sensor is limited in reducing size since it involves scanning using an LED, and its manufacturing cost is high because the light source is expensive.

The capacitive fingerprint sensor recognizes the pattern of a fingerprint based on a difference in electric charge between the ridges and valleys touching the fingerprint sensor.

A known example of the related art capacitive fingerprint sensor is described in U.S. Laid-Open Patent Application No. US2013/0307818 (hereinafter, "Related Art Technology 1") filed on Nov. 21, 2013, entitled "Capacitive Sensor Packaging". In Related Art Technology 1, a fingerprint sensor is an assembly with a particular push button attached to it, and comprises a silicon wafer, imprinted with a circuit for measuring the capacitance between a capacitive plate and the user's fingerprint (including the ridges and valleys).

In general, the ridges and valleys of a human fingerprint are very tiny, ranging from 300 µm to 500 µm. Thus, Related Art Technology 1 requires the manufacture of a high-resolution sensor array and an IC (integrated circuit) for fingerprint recognition, and uses a silicon wafer onto which the sensor array and the IC can be manufactured in an integrated manner. However, manufacturing the high-resolution sensor array and the IC together using the silicon wafer requires an assembly structure for coupling the push button and the fingerprint sensor together. This makes the configuration complicated and increases the size of a non-display area, for example, the bezel. Moreover, because the fingerprint sensor is disposed within the push button (e.g., the home key on a smartphone), leading to an increase in the thickness of the fingerprint sensor. Also, there are many design limitations since a fingerprint sensing area depends on the push button.

Research is underway on fingerprint recognition using a touchscreen that recognizes the user's finger or a stylus pen. Examples of this technology include U.S. Pat. No. 8,564,314 filed on Oct. 22, 2013, entitled "Capacitive Touch Sensor for Identifying a Fingerprint" and Korean Patent Registration No. 10-1432988 filed on Aug. 18, 2014, entitled "Fingerprint Recognition Integrated Capacitive Touchscreen" (hereinafter, "Related Art Technology 2").

FIG. 1 is a view schematically showing the arrangement of driving electrodes and sensing electrodes on a capacitive sensing panel proposed in Related Art Technology 1. FIG. 2 shows the configuration of a fingerprint recognition integrated capacitive touchscreen proposed in Related Art Technology 2. FIG. 3A shows a mutual capacitance-type touch sensor electrode pattern. FIG. 3B shows an example of a high-density sensor pattern.

Referring to FIG. 1, Related Art Technology 1 comprises touch sensors 3 comprising touch driving electrodes $1(x)$ and touch sensing electrodes $1(y)$ and fingerprint sensors 5 comprising fingerprint driving electrodes $5(x)$ and fingerprint sensing electrodes $5(y)$. In Related Art Technology 1, dedicated fingerprint sensors 5 for fingerprint recognition are disposed in a separate region, completely separated from a touchscreen, so a dead zone exists between the touch sensors 3 and the fingerprint sensors 5 where a touch cannot be recognized.

Referring to FIG. 2, Related Art Technology 2 comprises a touch panel AA, electrode connecting lines BB, and a touch controller CC. The touch panel AA has tiny channels A3 formed by a combination of first channel electrodes A1 and second channel electrodes A2 arranged to intersect each other. The tiny channels A3, except those in a fingerprint recognition sensor A4 area, are grouped into multiple groups and function as touch group channels A5 for touch signal detection, and the tiny channels A3 corresponding to the fingerprint recognition sensor A4 area function as fingerprint recognition channels A6. In Related Art Technology 2, the capacitance connected to sensor lines increases considerably because of the tiny channels (touch channels). The capacitance Cm connected to sensor lines of high-density sensors shown in FIG. 3B may be several tens to several hundreds of times higher than the capacitance Cm connected to sensor lines of low-density sensors shown in FIG. 3A. The increase in the capacitance connected to the sensor lines increases the time constant of Tx (transmitting) channels where a touch driving signal is supplied, and also increases the amount of voltage fluctuation and adds noise in Rx (receiving) channels where touch sensors receive, which results in lower sensing sensitivity.

BRIEF SUMMARY

The lower the time constant of the Tx channels, the greater the number of times a sensor driving signals may be applied to the sensors. This can increase the amount of electrical charge in the sensors and also can increase the number of times an integrator at a receiving end performs integration, thereby improving the sensor sensitivity. Moreover, the capacitance of the Rx channels should be low in order to reduce voltage fluctuations at the Rx channels and noise in received signals, and this leads to higher sensor sensitivity. However, if the sensors are packed densely to enable fingerprint sensing, the capacitance of the sensor lines increases, thereby reducing the sensitivity of fingerprint/touch input sensing.

An aspect of the present disclosure is to provide a fingerprint sensor integrated type touchscreen device which can reduce the capacitance connected to sensor lines when configuring a fingerprint sensor integrated type touchscreen panel in a high-density electrode pattern.

A fingerprint sensor integrated type touchscreen device according to one or more embodiments of the present disclosure comprises: a sensor array comprising a touch sensor area with sensors, a fingerprint and touch sensor area with sensors, sensor lines connected to the sensors in the touch sensor area, and sensors lines connected to the sensors in the fingerprint and touch sensor area; and an IC that is connected to the sensor lines in the touch sensor area and fingerprint and touch sensor area and that senses touch input in touch recognition mode, based on a change in sensor signals received from the touch sensor area and the fingerprint and touch sensor area, and senses a fingerprint in fingerprint recognition mode, based on a change in sensor signals received from the fingerprint and touch sensor area.

At least some of the sensor lines connected to the sensors in the fingerprint and touch sensor area are separated from the sensor lines connected to the sensors in the touch sensor area.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 3A is a view showing a mutual capacitance in touch sensors known in the art;

FIGS. 32 and 33 are views showing various embodiments of non-driven sensor lines.

DETAILED DESCRIPTION

Figure 1:
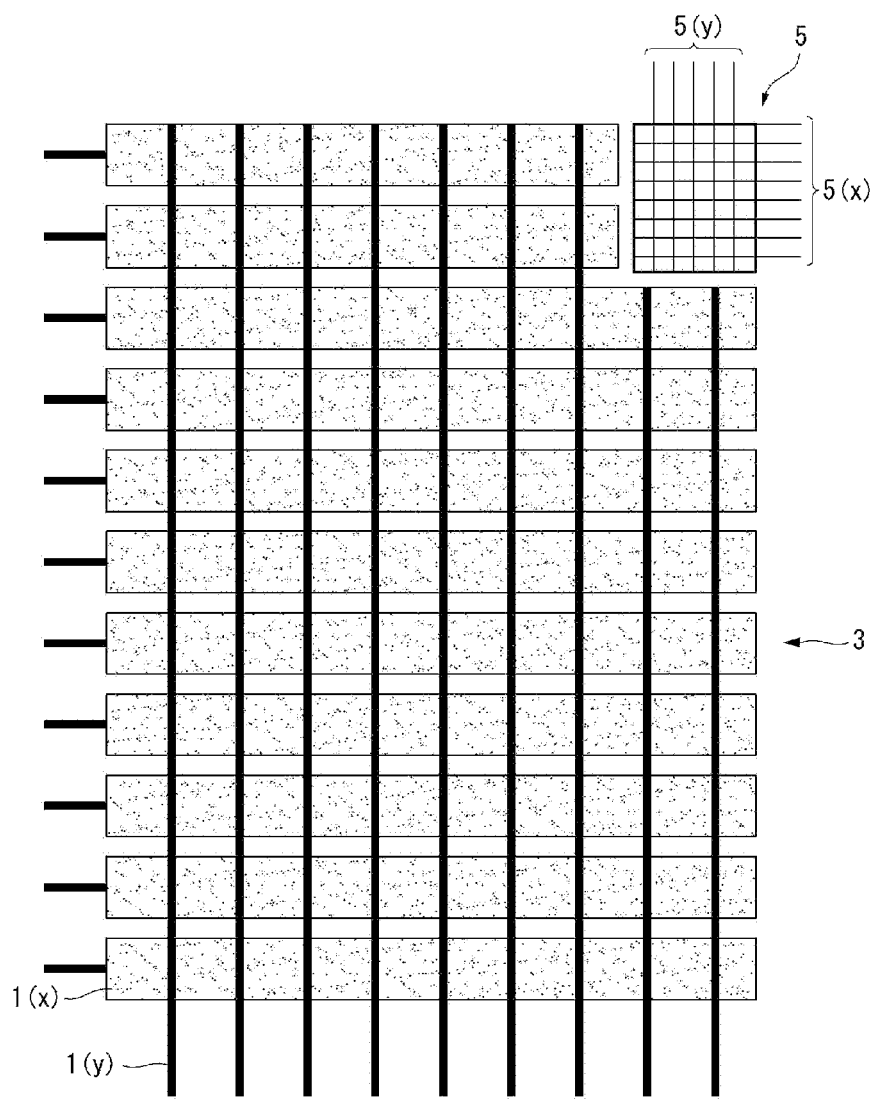
FIGS. 1 and 2 are views showing fingerprint sensors according to the related art.
Figure 2:
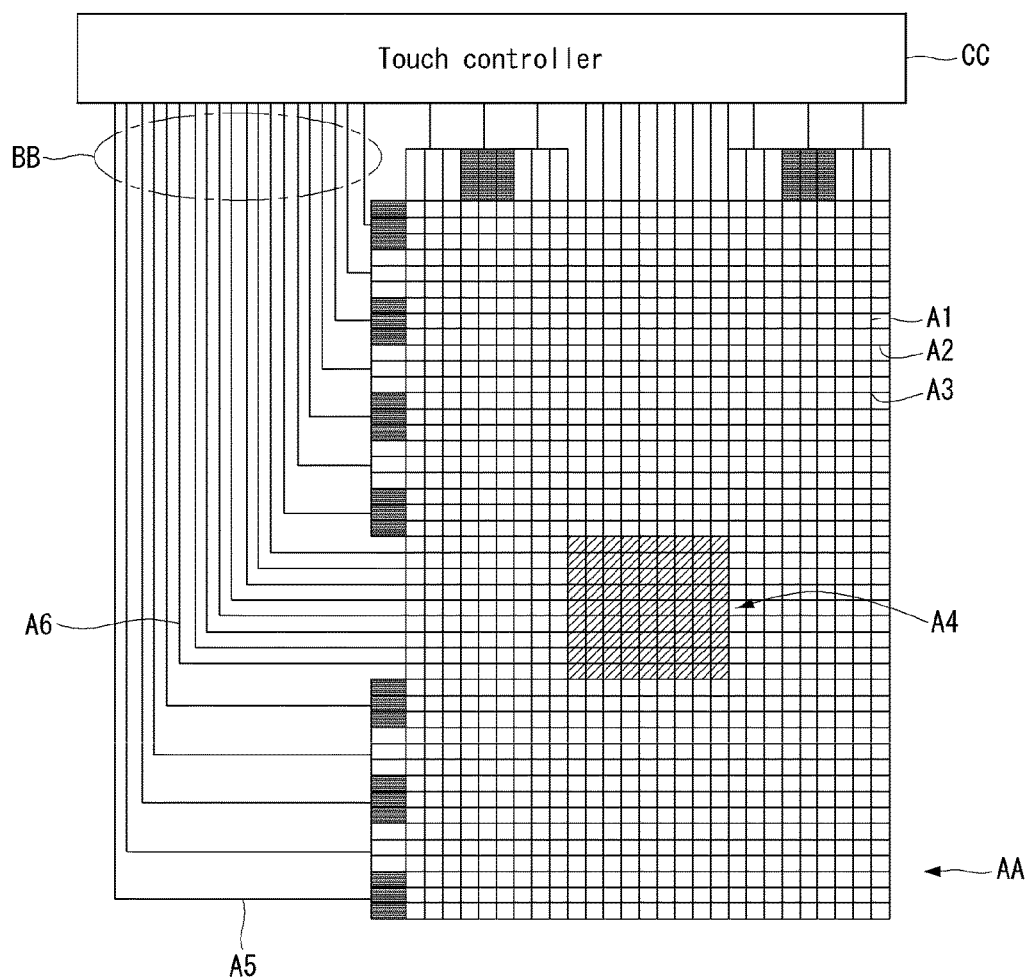
Figure 3B:
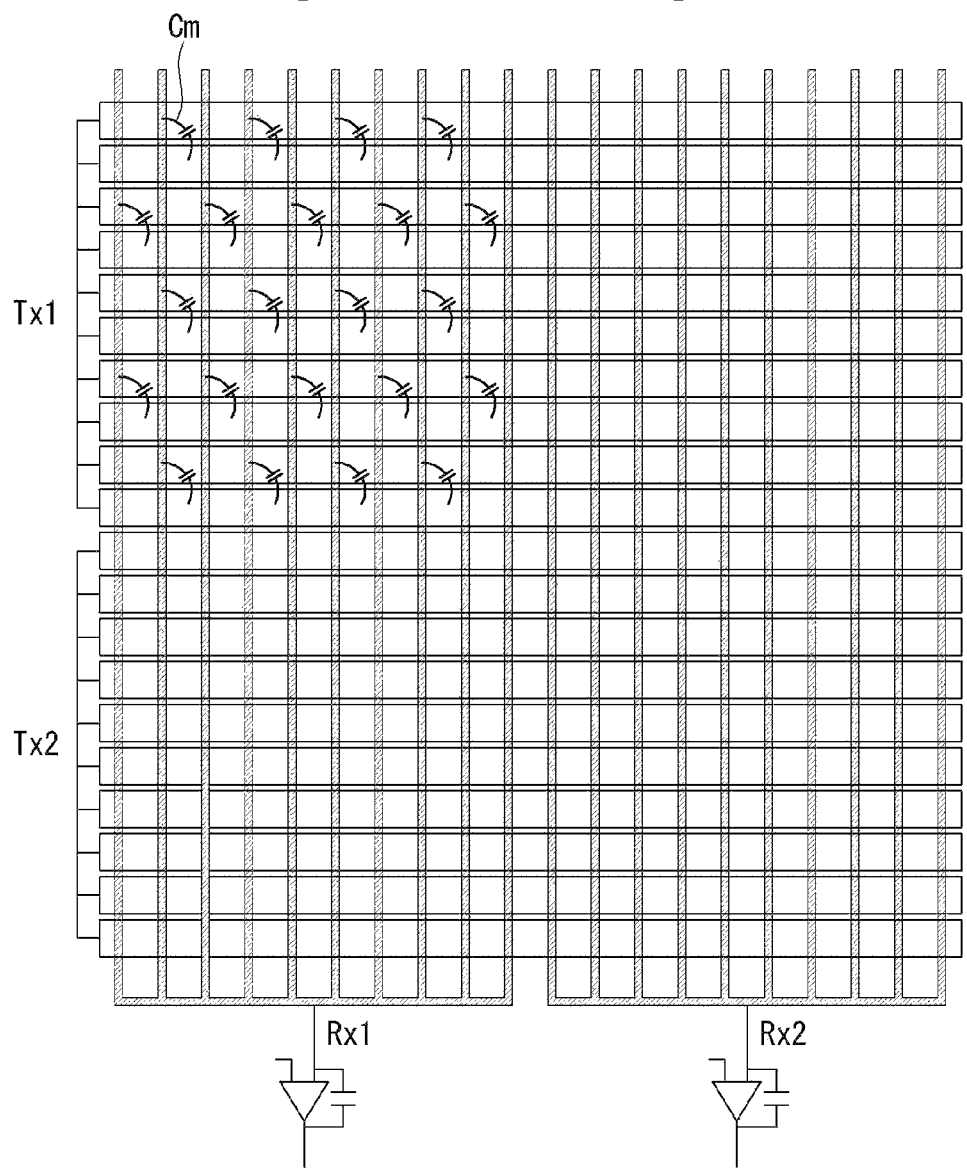
FIG. 3B is a view showing a mutual capacitance in a high-density sensor pattern of a touch sensor known in the art.

A display device to which a fingerprint sensor integrated type touchscreen device of the present disclosure is applied may be implemented based on flat panel displays such as a liquid crystal display (LCD), a field emission display (FED), a plasma display panel (PDP), an organic light-emitting display (OLED), an electrophoresis display (EPD), a quantum dot display (QDD), etc. It should be noted that, although the following embodiment will be described with respect to a liquid crystal display as an example of the flat panel displays, embodiments of display devices provided by this disclosure are not limited to liquid crystal displays.

In the present disclosure, touch input and fingerprints are sensed using high-density sensors capable of fingerprint sensing. Here, the term high-density means that a large number of sensors are placed per unit of area, meaning that the sensors have a fine pitch or high DPI (dots per inch). The higher density, the higher the accuracy of sensing.

Hereinafter, exemplary embodiments of the present disclosure will be described with reference to the attached drawings. Throughout the specification, the same reference numerals indicate substantially the same components. When it is deemed that a detailed description of known functions or configurations may unnecessarily obscure the subject matter of the present disclosure, the detailed description will be omitted.

Figure 4:
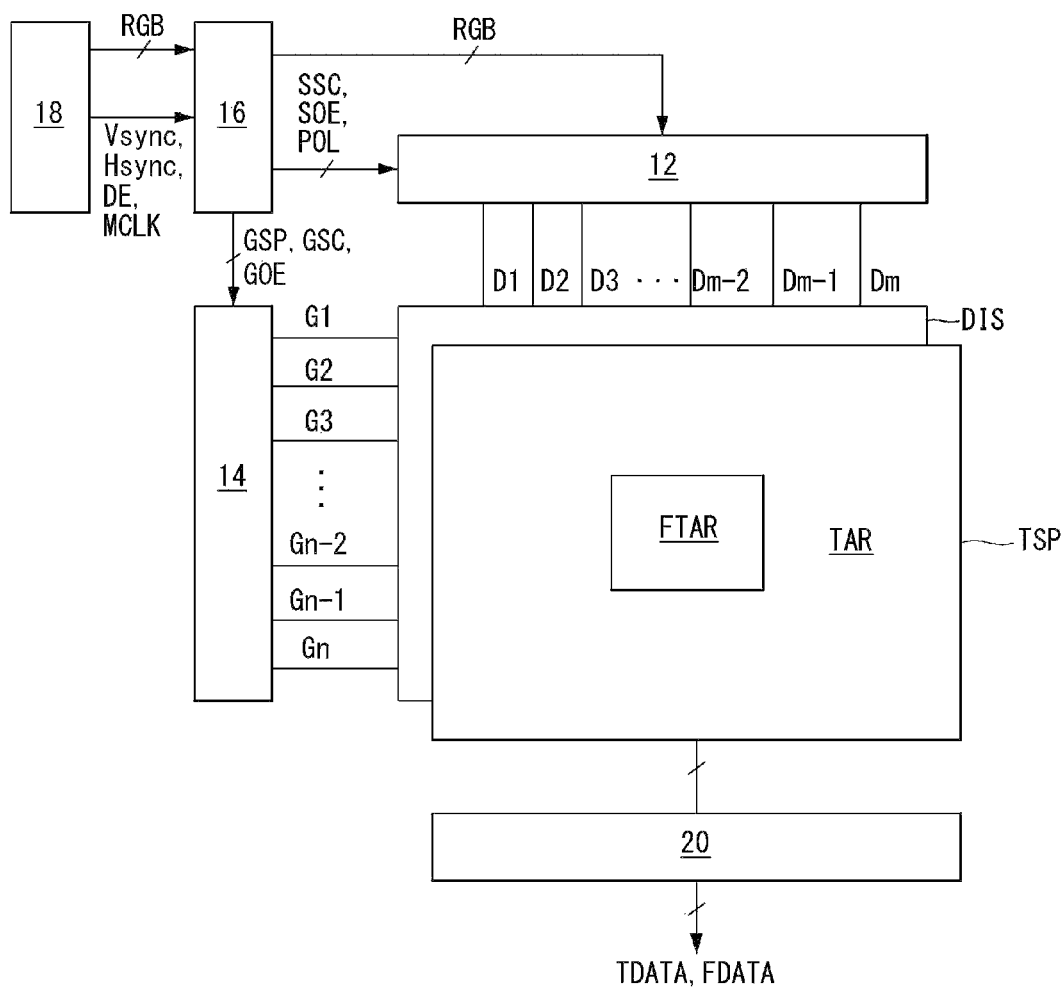
FIG. 4 is a block diagram showing a display device to which a fingerprint sensor integrated type touchscreen device is applied according to an exemplary embodiment of the present disclosure.

FIG. 4 shows a display device to which a fingerprint sensor integrated type touchscreen device is applied according to an exemplary embodiment of the present disclosure.

Referring to FIG. 4, a display device of this disclosure comprises a fingerprint sensor integrated type touchscreen device. That is, the fingerprint sensor is integrated into the touchscreen, as opposed to devices having a fingerprint sensor disposed outside of a touchscreen region. The fingerprint sensor integrated type touchscreen device comprises a touchscreen TSP and a touch IC 20.

The touchscreen TSP comprises a sensor array of densely packed sensors with capacitance and sensor lines connected to the sensors. The sensors on the touchscreen TSP are arranged on a pixel array of a display panel DIS where input images are reproduced.

There are two types of capacitance: self-capacitance and mutual capacitance. Self-capacitance may be formed along a single layer of conductor lines formed in one direction. Mutual capacitance is formed between two perpendicular conductor lines intersecting each other, with a dielectric layer (or insulating film) sandwiched between them. In the embodiment of the present disclosure, the sensors of the touchscreen TSP are implemented as mutual-capacitance Cm sensors by way of example, but not limited to them.

The sensor lines comprise Tx lines arranged in a first direction and Rx lines arranged in a second direction perpendicular to the first direction. Mutual capacitance Cm exists at every intersection of the Tx lines and Rx lines intersecting each other, with a dielectric layer (or insulating film) sandwiched between them.

The Tx lines are connected to the sensors to apply a sensor driving signal from the touch IC 20 to the sensors and supply an electrical charge to the sensors. The Rx lines are connected to the sensors to supply the electrical charge in the sensors to the touch IC 20. In mutual capacitive sensing, a sensor driving signal is applied to the TX electrodes of mutual capacitance sensors through the Tx lines to supply an electrical charge to the mutual capacitance sensors, and, in synchronization with the sensor driving signal, touch input can be sensed by sensing a change in the capacitance of the mutual capacitance sensors through the RX electrodes and the Rx lines.

The sensors of the touchscreen TSP may be attached to the display panel DIS in various ways. The sensors may be bonded onto an upper polarizer of the display panel DIS (add-on type), or may be formed between the upper polarizer of the display panel DIS and an upper substrate (on-cell type). In addition, the sensors of the touchscreen TSP may be embedded in the pixel array of the display panel DIS (in-cell type).

High-resolution sensors are placed on the touchscreen TSP to sense fingerprints, as well as touch input, on the touchscreen TSP. To this end, the Tx lines and the Rx lines consist of high-density sensor lines with narrow linewidth and fine pitch.

The touchscreen TSP may be divided into a fingerprint and touch sensor area FTAR and a touch sensor area TAR. The sensor lines in the fingerprint and touch sensor area FTAR and touch sensor area TAR may all consist of high-density sensor lines.

The high-density Tx lines in the fingerprint and touch sensor area FTAR and touch sensor area TAR may have the same pitch. The high-density Rx lines in the fingerprint and touch sensor area FTAR and touch sensor area TAR may have the same pitch. Meanwhile, the high-density Tx and Rx lines in the touch sensor area TAR are driven in groups of a predetermined size, whereas the Tx and Rx lines in the fingerprint and touch sensor area FTAR are driven independently so as to enable fingerprint sensing.

The numbers and shapes of the sensor lines in the fingerprint and touch sensor area FTAR and touch sensor area TAR are not limited to those illustrated in the drawings. It should be noted that the sensor lines illustrated in the drawings are simplified for easy understanding of the disclosure.

Figure 5:
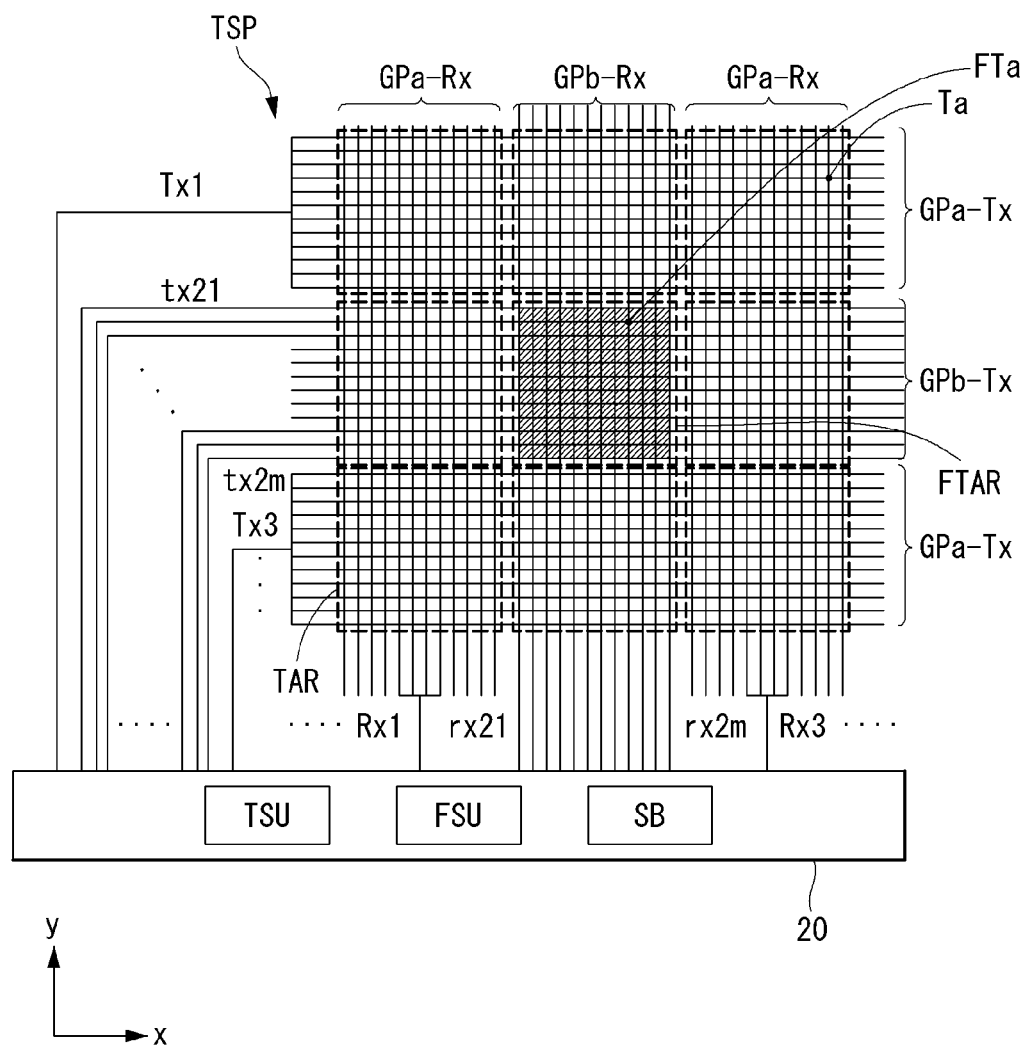
FIG. 5 shows a fingerprint sensor integrated type touchscreen device according to an exemplary embodiment of the present disclosure.

The sensors in the fingerprint and touch sensor area FTAR sense touch input from a finger or pen in touch recognition mode. In contrast, the sensors in the touch sensor area TAR can only sense touch input. Although FIGS. 4 and 5 show an example in which the fingerprint and touch sensor area FTAR is placed in only one location at the center of the touchscreen TSP, it should be noted that the number and position of fingerprint and touch sensor areas FTAR are not limited to those illustrated in the drawings. For example, the fingerprint and touch sensor areas FTAR may be provided in multiple locations integrated in the touchscreen TSP, at edge regions of the touchscreen TSP, or even in an entire area of the touchscreen TSP, in various embodiments. The Tx lines and Rx lines in the fingerprint and touch sensor area FTAR and touch sensor area TAR consist of high-density sensor lines. The Rx lines in the touch sensor area TAR may be connected in groups of such a size as to enable touch input sensing in touch recognition mode, and may be sequentially driven in these groups. A Tx line group comprises two or more Tx lines connected together through a shorting line, and is connected to one Tx channel of the touch IC 20. The Tx line group is driven in the same way as one Tx line in touch recognition mode. An Rx line group comprises two or more Rx lines connected together through a shorting line, and is connected to one Rx channel of the touch IC 20. On the other hand, the Tx lines and Rx lines in the fingerprint and touch sensor area FTAR are separated from each other so as to sense the ridges and valleys of a fingerprint. The Tx lines in the fingerprint and touch sensor area FTAR are connected on a 1:1 basis to discrete Tx channels of the touch IC 20 and are driven independently. The Rx lines in the fingerprint and touch sensor area FTAR are connected on a 1:1 basis to discrete Rx channels of the touch IC 20.

Since the Tx lines and the Rx lines consist of high-density sensor lines, the sensors in the fingerprint and touch sensor area FTAR may sense the ridges and valleys of a fingerprint. Meanwhile, because touch input from a finger or pen does not need as high a resolution as for fingerprint sensing, the sensors in the touch sensor area TAR may be grouped in touch sensing groups of a predetermined size and driven in these groups. As shown in FIG. 5, the Tx lines and the Rx lines each may be grouped into groups. Sensors may be grouped by connecting the sensor lines connected to the sensors and short-circuiting the lines. Grouping sensors together and driving them simultaneously may reduce the number of sensor driving signals supplied to the sensors and the number of times sensing occurs, thereby reducing power consumption and touch report rate. The touch report rate is the rate at which touch input coordinates are sent to a host system. The higher the touch report rate, the higher the update rate of touch input coordinates, which allows for better touch sensitivity.

When the sensors are driven in touch sensing groups, the mutual capacitance Cp and parasitic capacitance of the sensors created by one sensing operation may become too high. This can decrease the quantity of charge in the sensors to be received by the touch IC 20 and increase noise, thus resulting in low sensing performance. The parasitic capacitance is a parasitic capacitance in the touchscreen TSP and display panel DIS that is coupled to the sensors.

In the present disclosure, when grouping touch sensors in a touch sensing group, only some sensors in the touch sensing group may be driven properly, but the other sensors are not driven, in order to reduce side effects of dense packing of sensor lines, including the increases in mutual capacitance and parasitic capacitance. Specifically, the touch IC 20 senses a change in the amount of electric charge in the sensors through the Rx lines connected to the sensors in the touch sensing group that are properly operating, and puts the Rx lines connected to the non-driven sensors to a floating state or grounds them. Putting the Rx lines to a floating state means that the current path between the Rx lines and the Rx channels of the touch IC is interrupted. Grounding the Rx lines means that a ground voltage is applied to the Rx lines.

The touch IC 20 is connected to the sensors in the touch sensor area TAR and fingerprint and touch sensor area FTAR, and senses touch input based on a change in sensor signals received from the touch sensor area TAR and fingerprint and touch sensor area FTAR in touch recognition mode and senses a fingerprint based on a change in sensor signals received from the fingerprint and touch sensor area FTAR in fingerprint recognition mode. Specifically, the touch IC 20 is connected to the sensor lines in the touch sensor area TAR and fingerprint and touch sensor area FTAR, and senses touch input on the touch sensor area TAR and fingerprint and touch sensor area FTAR without a dead zone in touch recognition mode, and senses a user's fingerprint on the fingerprint and touch sensor area FTAR in fingerprint recognition mode. That is, the touch sensor area TAR and fingerprint and touch sensor area FTAR are driven by one touch IC 20.

The touch IC 20 comprises a driving signal supply unit that supplies a sensor driving signal to the Tx lines through the Tx channels, Rx channels connected to the Rx lines, and a sensing unit that senses a change in the electrical charge in the sensors through the Rx channels. The sensing unit comprises a touch sensing unit that senses touch input and a fingerprint sensing unit that senses fingerprint information. In the drawings, Tx1 to Tx3 denote Tx channels, and Rx1 to Rx3 denote Rx channels.

The touch IC 20 further comprises a switch array that selectively connects the Rx lines connected to the sensors in the fingerprint and touch sensor area FTAR to the touch sensing unit and the fingerprint sensing unit. The switch array switches the current path between the Rx lines and the touch IC in response to a touch enable signal and a fingerprint enable signal.

The touch IC 20 amplifies an electric charge in sensors, and provides the amplified electric charge as input to an integrator. Then, the integrator accumulates the charge quantity, which increases the amount of change in electric charge before and after a touch input or fingerprint input. The voltage accumulated in the integrator's capacitor is input into an analog-to-digital converter ADC and converted to digital data. Then, the touch IC compares the digital value (raw data) output from the ADC with a preset threshold, and if the digital value is higher than the threshold, determines that the touch input or fingerprint input has come from the corresponding sensors. The threshold may be classified as a first threshold for recognizing touch input and a second threshold for recognizing fingerprint input. The touch IC 20 sends to a host system 18 touch input coordinate data TDATA in touch recognition mode and fingerprint sensing data FDATA in fingerprint recognition mode. The touch input coordinate data TDATA is obtained based on a change in the electrical charge in the sensors placed in the fingerprint and touch sensor area FTAR and touch sensor area TAR, and the fingerprint sensing data FDATA is obtained based on a change in the electrical charge in the sensors placed in the fingerprint and touch sensor area FTAR.

The display device in one or more embodiments of this disclosure further comprises the display panel DIS, display driver circuits 12, 14, and 16, and the host system 18.

The display panel DIS comprises a liquid crystal layer formed between two substrates. The pixel array on the display panel DIS comprises pixels defined by a matrix of data lines D1 to Dm (where m is a positive integer) and gate lines G1 to Gn (where n is a positive integer) to display an input image. Each pixel may comprise TFTs (thin film transistors) formed at the intersections of the data lines D1 to Dm and the gate lines G1 to Gn, a pixel electrode that is charged with a data voltage, and a storage capacitor Cst connected to the pixel electrode to hold the voltage of a liquid crystal cell. The liquid crystal cell adjusts the transmittance of light passing through the pixels according to the input image's data by using liquid crystal molecules which are driven by a voltage difference between a data voltage applied to the pixel electrode and a common voltage applied to a common electrode.

A black matrix, color filters, etc. are formed on the upper substrate of the display panel DIS. The lower substrate of the display panel DIS may be implemented in a COT (color filter on TFT) structure. In this case, the black matrix and the color filters may be formed on the lower substrate of the display panel DIS. The common electrode to be supplied with a common voltage may be formed on the upper or lower substrate of the display panel DIS. Polarizers are respectively attached to the upper and lower substrates of the display panel DIS, and an alignment film for setting a pre-tilt angle of liquid crystals is formed on an inner surface contacting the liquid crystals. A column spacer is formed between the upper and lower substrates of the display panel DIS to maintain a cell gap for the liquid crystal cell.

The display panel DIS may be implemented, for example, in any well-known liquid crystal mode, such as a TN (Twisted Nematic) mode, a VA (Vertical Alignment) mode, an IPS (In-Plane Switching) mode, and an FFS (Fringe Field Switching) mode. A backlight unit may be disposed under the back of the display panel DIS. The backlight unit may be implemented as an edge-type or direct-type backlight unit which illuminates the display panel DIS.

The display driver circuits comprise a data drive circuit 12, a scan drive circuit 14, and a timing controller 16, and writes the input image's video data to the pixels on the display panel DIS. The data drive circuit 12 converts digital video data RGB input from the timing controller 16 to an analog positive/negative gamma compensation voltage to generate a data voltage, and outputs the data voltage to the data lines D1 to Dm. The scan driver circuit 14 sequentially supplies a gate pulse (or scan pulse) to the gate lines G1 to Gn to select pixel lines from the display panel DIS to write the data voltage to.

The timing controller 16 receives timing signals such as a vertical synchronization signal Vsync, horizontal synchronization signal Hsync, data enable signal DE, main clock MCLK, etc. input from the host system 18, and synchronizes the operation timings of the data driver circuit 12 and scan driver circuit 14. The timing signals received from the host system 18 are synchronized with the input image's data. Scan timing control signals comprise a gate start pulse (GSP), a gate shift clock, a gate output enable (GOE) signal, etc. Data timing control signals comprise a source sampling clock SSC, a polarity control signal POL, a source output enable signal SOE, etc. In the case of an OLED display, the polarity control signal POL is not required.

The host system 18 may be implemented in one or more embodiments as any one of the following: a television system, a set-top box, a navigation system, a DVD player, a Blue-ray player, a personal computer PC, a home theater system, and a phone system. The host system 18 comprises a system-on-chip (SoC) having a scaler incorporated in it, and converts digital video data RGB of an input image into a format suitable for display on the display panel DIS. The host system 18 transmits the timing signals Vsync, Hsync, DE, and MCLK, along with the digital video data, to the timing controller 16. Further, the host system 18 compares fingerprint coordinates input from the touch IC 20 with stored fingerprint data to determine the degree of matching and perform a user authentication procedure, and runs the display device according to the user's instruction once the user is verified. After the user authentication, the host system 18 executes an application associated with touch input coordinates.

Figure 6:
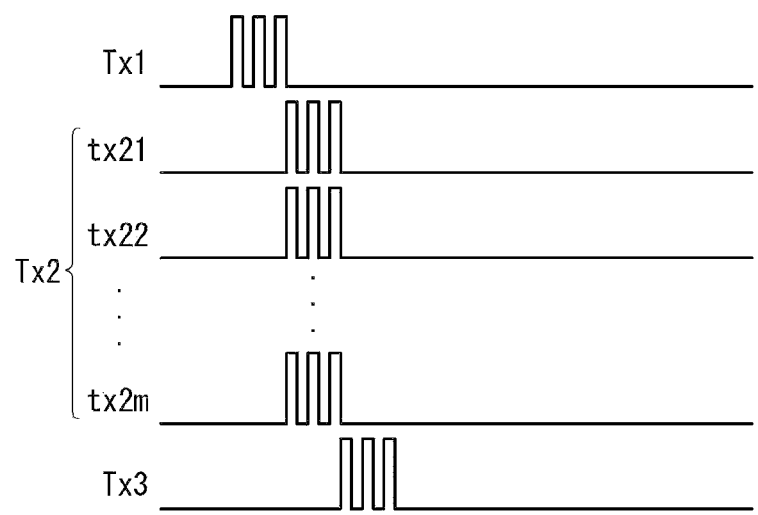
FIG. 6 shows a waveform diagram of a sensor driving signal applied to the fingerprint sensor integrated type touchscreen in touch recognition mode.
Figure 7:
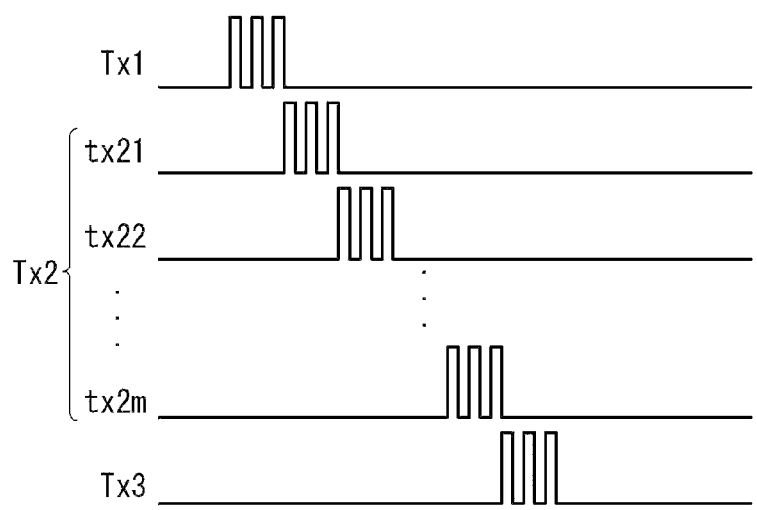
FIG. 7 shows a waveform diagram of a sensor driving signal applied to the fingerprint sensor integrated type touchscreen in fingerprint recognition mode.

FIG. 5 shows a fingerprint sensor integrated type touchscreen device according to an exemplary embodiment of the present disclosure. FIG. 6 shows a waveform diagram of a sensor driving signal applied to the fingerprint sensor integrated type touchscreen in touch recognition mode. FIG. 7 shows a waveform diagram of a sensor driving signal applied to the fingerprint sensor integrated type touchscreen in fingerprint recognition mode.

Referring to FIGS. 5 to 7, the touch sensor area TAR on the touchscreen TSP has a first group GPa-Tx of Tx lines arranged side by side in a first direction (y), a first group GPa-Rx of Rx lines arranged side by side in a second direction (x) and intersecting the first group GPa-Tx of Tx lines, and touch sensors Ta formed at the intersections of the first group GPa-Tx of Tx lines and the first group GPa-Rx of Rx lines.

The fingerprint and touch sensor area FTAR on the touchscreen TSP has a second group GPb-Tx of Tx lines arranged side by side in the first direction (y), a second group GPb-Rx of Rx lines arranged side by side in the second direction (x) and intersecting the second group GPb-Tx of Tx lines, and fingerprint and touch sensors FTa formed at the intersections of the second Tx group GPb-Tx of transmission lines and the second group GPb-Rx of Rx lines.

Figure 13:
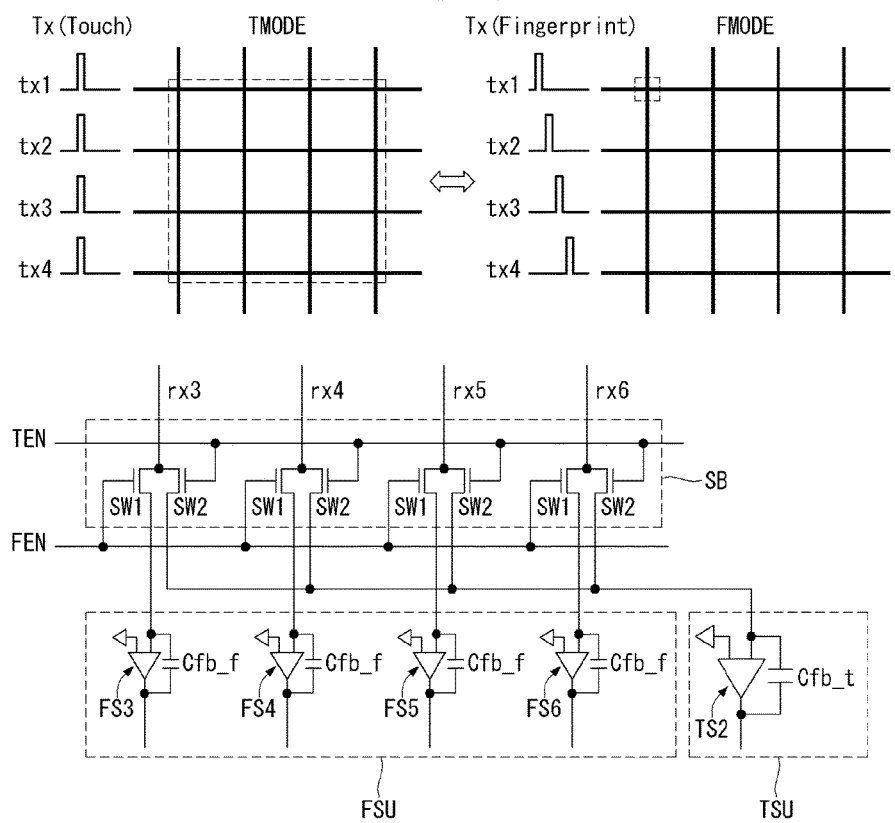
FIG. 13 shows in detail the configuration and operation of the switch array of FIG. 12.

The touch IC 20 enables touch recognition mode in response to a touch enable signal (TEN of FIG. 13) input from the host system 18, and enables fingerprint recognition mode in response to a fingerprint enable signal (FEN of FIG. 13).

In touch recognition mode TMODE, the touch IC 20 groups the Tx lines in the touch sensor area TAR and fingerprint and touch sensor area FTAR into groups and sequentially drives the Tx lines in these groups. In touch recognition mode TMODE, the touch IC 20 supplies a sensor driving signal with the same phase to the Tx lines in a group, as shown in FIG. 6. The touch IC 20 groups the Tx lines into groups and sequentially drives them in these groups, and groups the Rx lines into groups and performs sensing through the touch sensing unit TSU in synchronization with the sensor driving signal. To prevent an abrupt increase in capacitance, only some of the Rx lines in a group may be sensed. In an example, in touch recognition mode TMODE, the touch IC 20 may select some of the Rx lines in a group by a switch array SB and connects them to the sensing unit TSU.

In touch recognition mode TMODE, the touch IC 20 senses a change in the electrical charge in the sensors, input through the first and second Rx line groups GPa-Rx and GPb-Rx, and detects the presence or absence of a touch from a conductive material, such as a finger or stylus pen, and the touch position.

In fingerprint recognition mode FMODE, the touch IC 20 supplies a sensor driving signal with a sequential phase delay to the second group GPb-Tx of Tx lines connected to the sensors FTa in the fingerprint and touch sensor area FTAR to sequentially drive the second group GPb-Tx of Tx lines tx21 to tx2*m* individually on a line-by-line basis. The Tx lines tx21 to tx2*m* in the second Tx line group GPb-Tx are driven individually and not connected to one another so that they can sense fingerprints. In fingerprint recognition mode FMODE, the touch IC 20 senses a change in the electrical charge in the sensors in the fingerprint and touch sensor area FTAR through the second group GPb-Rx of Rx lines individually, in synchronization with the sensor driving signal applied to the Tx lines tx21 to tx2*m*. The Rx lines rx21 to rx2*m* in the second Rx line group GPb-Rx are not connected to one another so that they can sense fingerprints.

In fingerprint recognition mode FMODE, the touch IC 20 connects the Rx lines rx21 to rx2*m* to the fingerprint sensing unit FSU by the switch array SB. In fingerprint recognition mode FMODE, the touch IC 20 senses a fingerprint, based on a change in the electrical charge in the sensors in the fingerprint and touch sensor area FTAR received through the Rx lines rx21 to rx2*m*.

Figure 8:
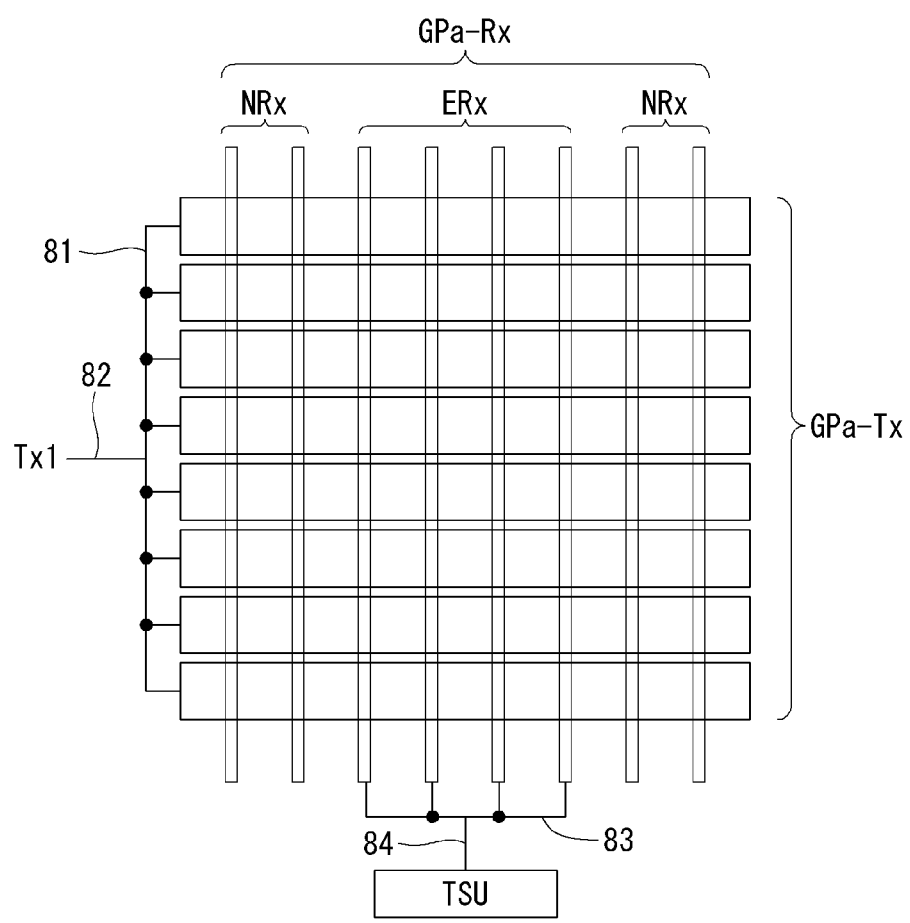
FIG. 8 is a view showing sensor lines formed in the touch sensor area of the device shown in FIG. 5.
Figure 9:
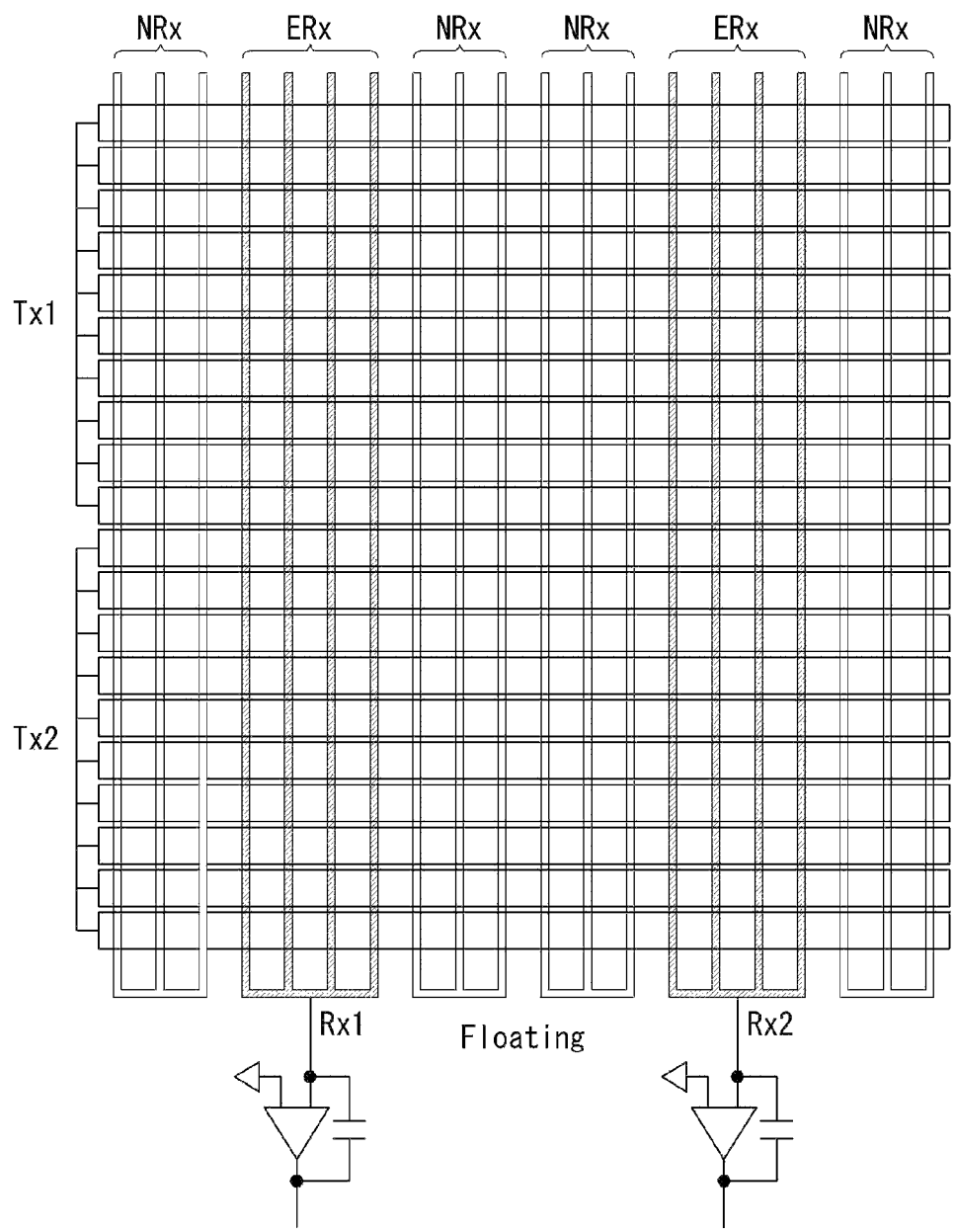
FIGS. 9 to 11 are views showing various embodiments of the present disclosure for reducing the increase in capacitance caused by high-density sensor lines.
Figure 10:
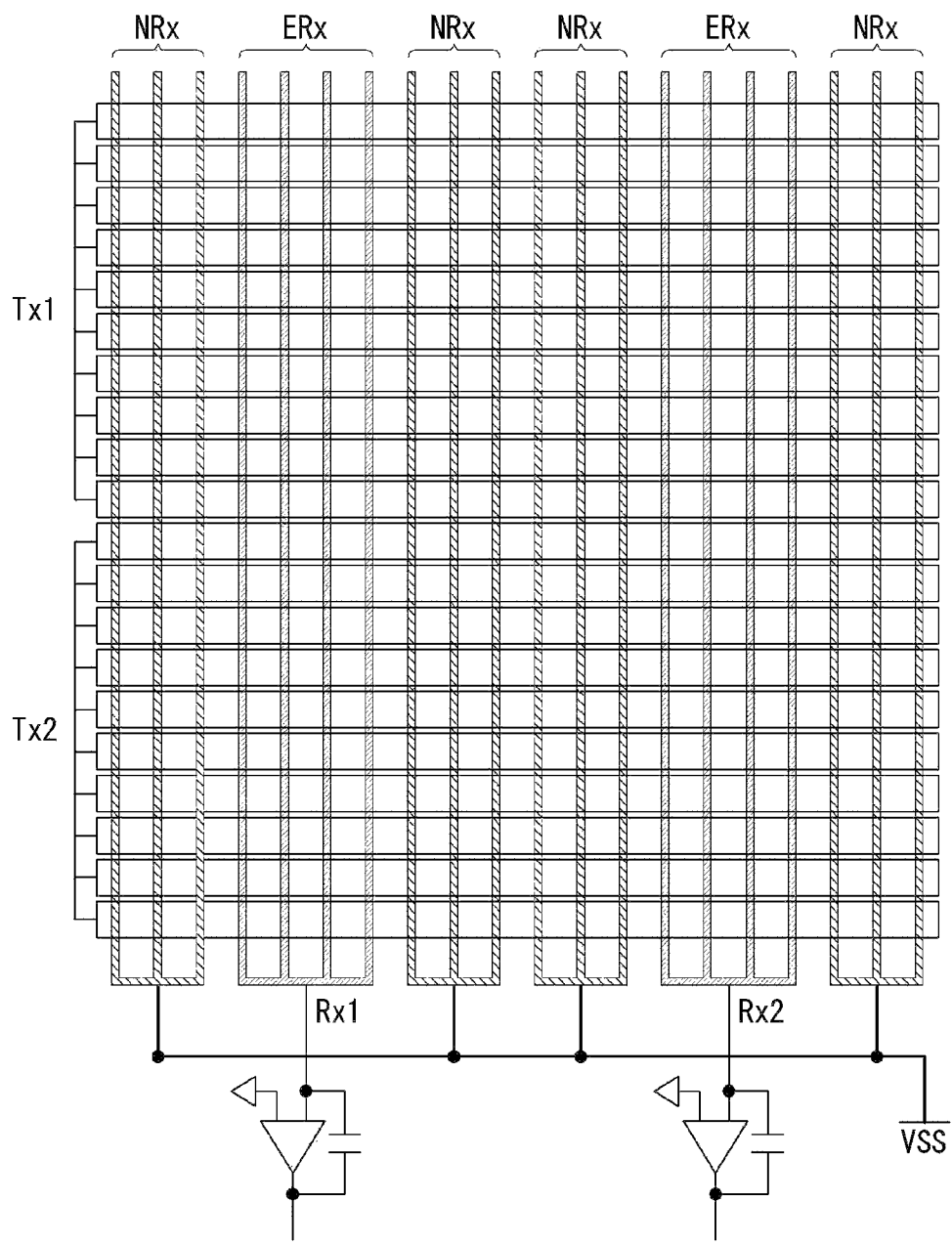
Figure 11:
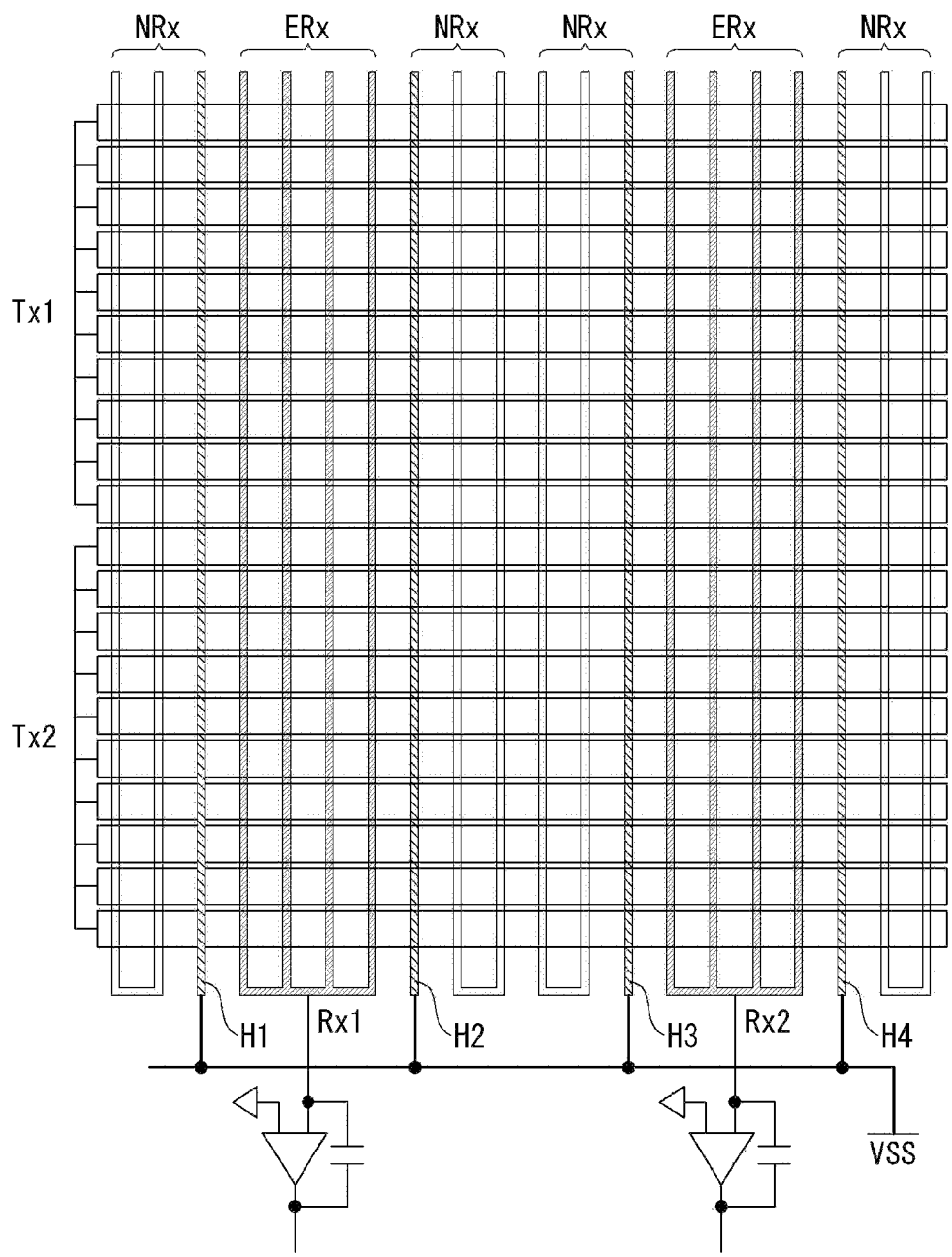

FIG. 8 shows Tx lines and Rx lines running through the touch sensor area TAR. FIGS. 9 to 11 are views showing various embodiments of the present disclosure for reducing the increase in capacitance caused by high-density sensor lines.

Referring to FIG. 8, the touch sensor area TAR is formed by the intersections of the first group GPa-Tx of Tx lines and the first group GPa-Rx of Rx lines. The Tx lines in the touch sensor area TAR are connected in Tx groups through a shorting line 81. The Tx channels of the touch IC 20 are connected to the shorting line 81 through a Tx routing line 82.

If the capacitance connected to the Rx lines is large, this causes a fluctuation in the input voltage of the integrator through the Rx channels of the sensing unit and increases noise. To reduce the capacitance connected to the Rx channels of the touch IC 20, the touch IC 20 connects only part of the first group GPa-Rx of Rx lines to the Rx channels. To this end, the first group GPa-Rx of Rx lines is divided into ineffective channels NRx not connected to the Rx channels of the touch IC and a group of effective channels ERx connected to the Rx channels of the touch IC. The distance between adjacent effective channels ERx should be sufficient to meet the resolution at which touch input from a finger or pen can be sensed.

The Rx lines of the effective channel group ERx in the touch sensor area TAR are connected through a shorting line 83. The Rx channels of the touch IC 20 are connected to the shorting line 83 through an Rx routing line 84.

In touch recognition mode, the touch IC 20 supplies the same sensor driving signal to the first group GPa-Tx of Tx lines through the shorting line 81, and connects the Rx lines of the first effective channel group ERx, among the first group GPa-Rx of Rx lines, to the touch sensing unit TSU through the Rx channels and senses a change in the electrical charge in the sensors. The non-driven Rx lines of the first ineffective channels NRx, among the first group GPa-Rx of Rx lines, are not connected to the touch sensing unit TSU but put into a floating state or grounded by a low-level voltage VSS or a specific direct-current voltage applied to them. As shown in FIGS. 9 to 11, the touch IC 20 may reduce the capacitance connected to the Rx channels by connecting only part of the first group GPa-Rx of Rx lines to the Rx channels.

As shown in FIG. 11, the touch IC 20 may put some of the non-driven Rx lines of the ineffective channels NRx to a floating state and ground the remaining part by using the switch array SB. As shown in FIG. 11, part H1, H2, H3, and H4 of the non-driven Rx lines of the ineffective channels NRx adjacent to the effective channel groups ERx may be connected to a low-level voltage source VSS, and the other non-driven Rx lines may be put into a floating state.

Figure 12:
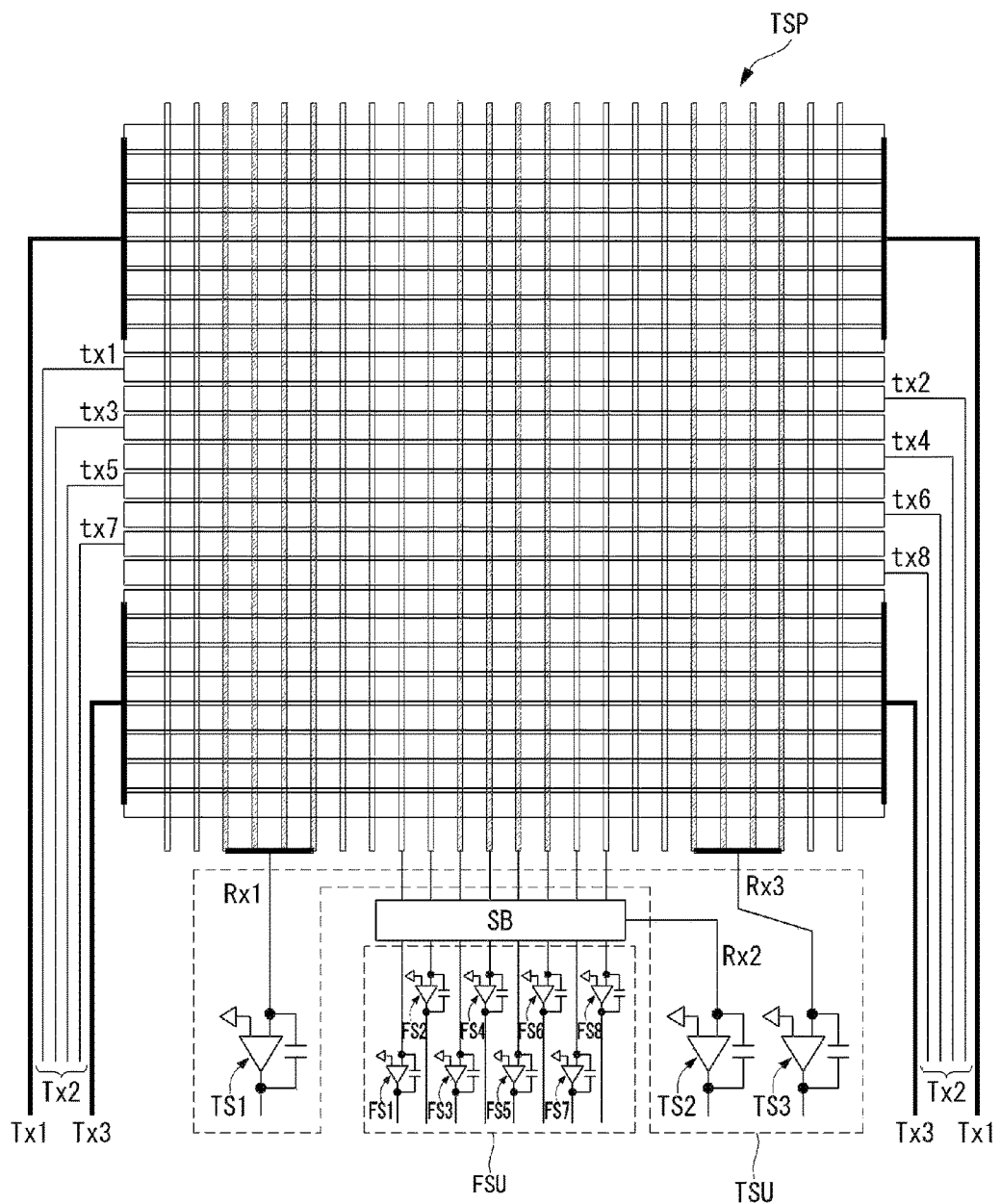
FIG. 12 is a view showing in detail an input circuit of Rx channels in a touch IC according to an exemplary embodiment of the present disclosure.
Figure 14A:
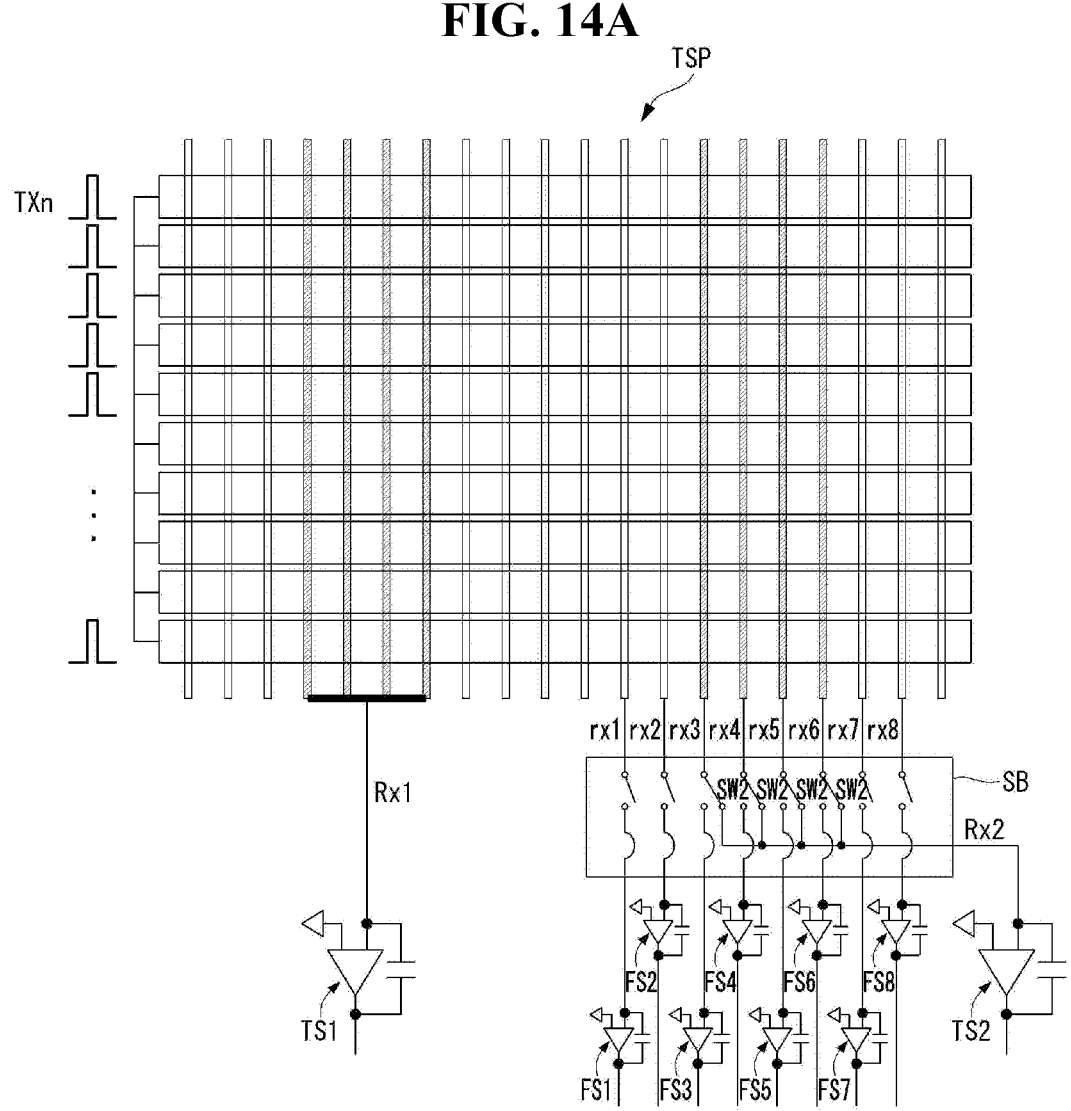
FIG. 14A is a view showing the operation of the fingerprint sensor integrated type touchscreen device in touch recognition mode.
Figure 14B:
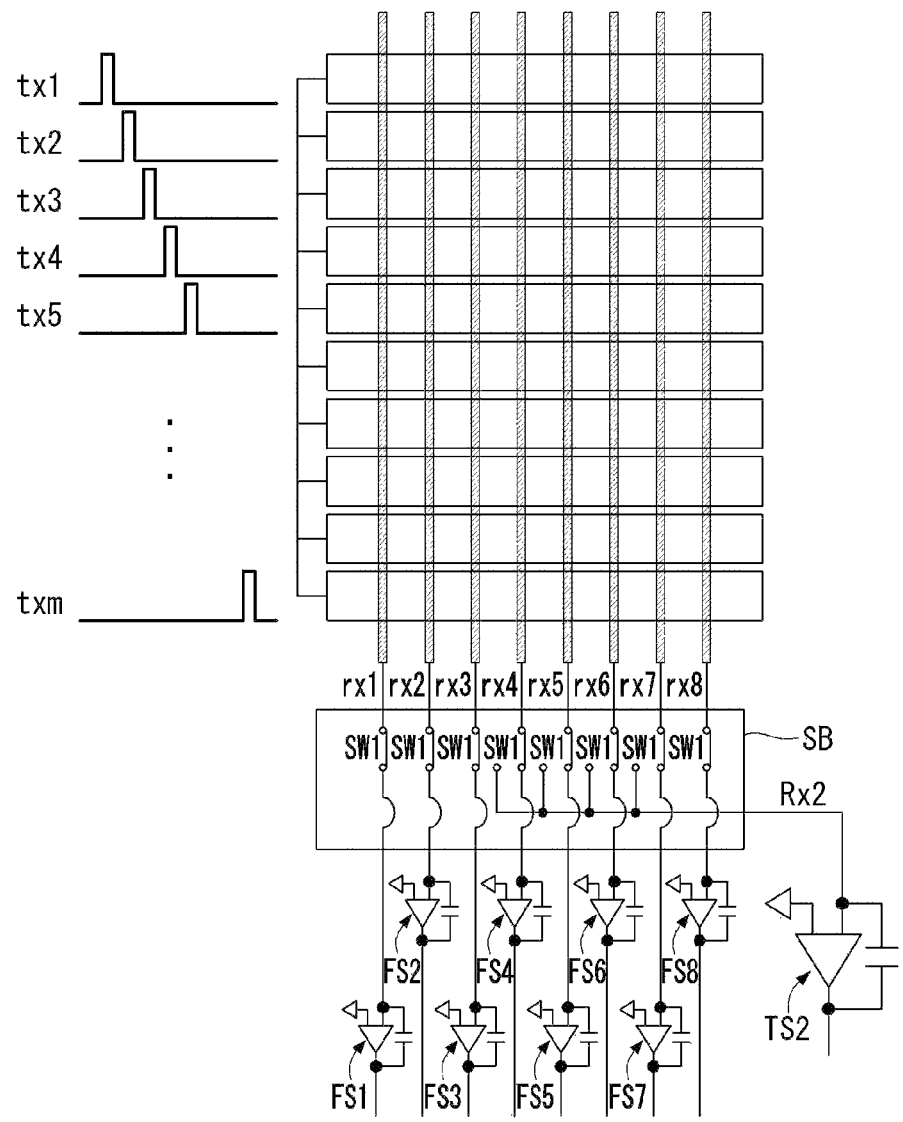
FIG. 14B is a view showing the operation of the fingerprint sensor integrated type touchscreen device in fingerprint recognition mode.

FIG. 12 shows in detail an input circuit of the Rx channels in the touch IC 20 according to the present disclosure. FIG. 13 shows in detail the configuration and operation of the switch array SB. FIG. 14A shows the operation of the fingerprint sensor integrated type touchscreen device in touch recognition mode. FIG. 14B shows the operation of fingerprint sensor integrated type touchscreen device in fingerprint recognition mode.

Referring to FIGS. 12 to 14, the touch sensing unit TSU comprises a plurality of touch sensing parts TS1, TS2, and TS3 that are separated for different Rx channels of the touch sensor area TAR. The Rx lines in the touch sensor area TAR are connected through the shorting line 81 and divided into groups, and the Rx lines in each group are connected to the touch sensing unit TS1 through one Rx channel. For example, the Rx lines in a first effective channel group are connected to the first touch sensing part TS1 through a first Rx channel Rx1, and the Rx lines in a third effective channel group are connected to the third touch sensing part TS3 through a third Rx channel Rx3. The Rx lines in a second effective channel group are connected to the second touch sensing part TS2 through a second Rx channel Rx2 and the switch array SB.

The fingerprint sensing unit FSU comprises a plurality of fingerprint sensing parts FS1 to FS8 that receive sensor signals through the RX channels connected to the Rx lines in the fingerprint and touch sensor area FTAR. Each of the fingerprint sensing parts FS1 to FS8 connects the touch sensing unit TSU through switch array SB.

In touch recognition mode, the switch array SB connects the Rx lines rx3, rx4, rx5, and rx6 in the effective channel group among the second group GPb-Rx of Rx lines commonly to the touch sensing part TS2, as shown in FIG. 14A, in response to a touch enable signal (TEN of FIG. 13). In fingerprint recognition mode, the switch array SB connects all the Rx lines rx1 to rx8 in the second group GPb-Rx of Rx lines to the fingerprint sensing parts FS1 to FS8, respectively, as shown in FIG. 14B, in response to a fingerprint enable signal (FEN of FIG. 13).

As shown in FIG. 13, the switch array SB comprises first switches SW1 that turn on in response to the touch enable signal FEN and connect the second group GPb-Rx of Rx lines to the inputs of the fingerprint sensing parts FS1 to FS8, respectively, and second switches SW2 that turn on in response to the touch enable signal FEN and connect the Rx lines rx3, rx4, rx5, and rx6 in the effective channel group among the second group GPb-Rx of Rx lines commonly to the input of the touch sensing part TS2.

Each of the touch sensing parts TS1, TS2, and TS3 and each of the fingerprint sensing parts FS1 to FS8 comprise an operational amplifier OP. amp and a capacitor Cfb_f and Cfb_t connected between the inverting input and output of the operational amplifier. The capacitance of the capacitors Cfb_t of the touch sensing parts TS1, TS2, and TS3 is designed to be greater than the capacitance of the capacitors Cfb_f of the fingerprint sensing parts FS1 to FS8. In the drawings, the integrator connected to the output of the operational amplifier and the ADC connected to the output of the integrator are omitted.

To improve the sensing sensitivity of the touchscreen TSP, the capacitance of the sensor lines, that is, the capacitance of the Rx lines connected to the Rx channels of the touch IC 20, needs to be reduced. As discussed earlier, the present disclosure can reduce the capacitance of the Rx lines connected to the Rx channels by connecting only the Rx lines spaced apart from one another by a distance that allows for touch sensing to the Rx channels of the touch IC 20. Further, the present disclosure can further reduce the capacitance and resistance connected to the sensor lines by separating at least some of the sensor lines in the fingerprint and touch sensor area FTAR from the sensor lines in the touch sensor area TAR as in the following embodiments. Moreover, the following embodiments can further reduce the capacitance and resistance of the Rx lines in the fingerprint and touch sensor area FTAR by placing these Rx lines close to the touch IC 20.

Figure 15:
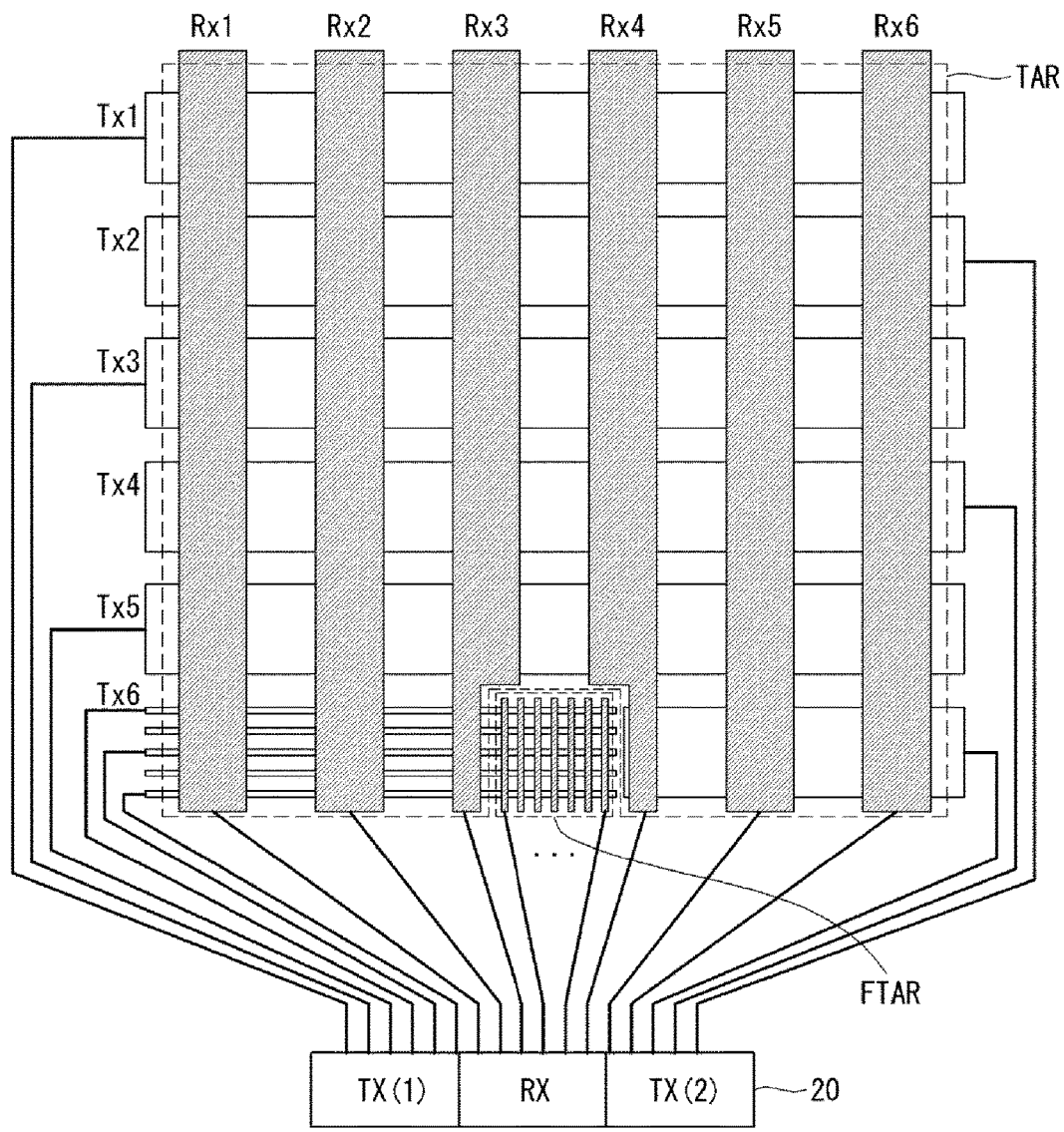
FIG. 15 is a view showing a method of dividing sensor lines in a fingerprint and touch sensor area according to a first exemplary embodiment of the present disclosure.
Figure 16:
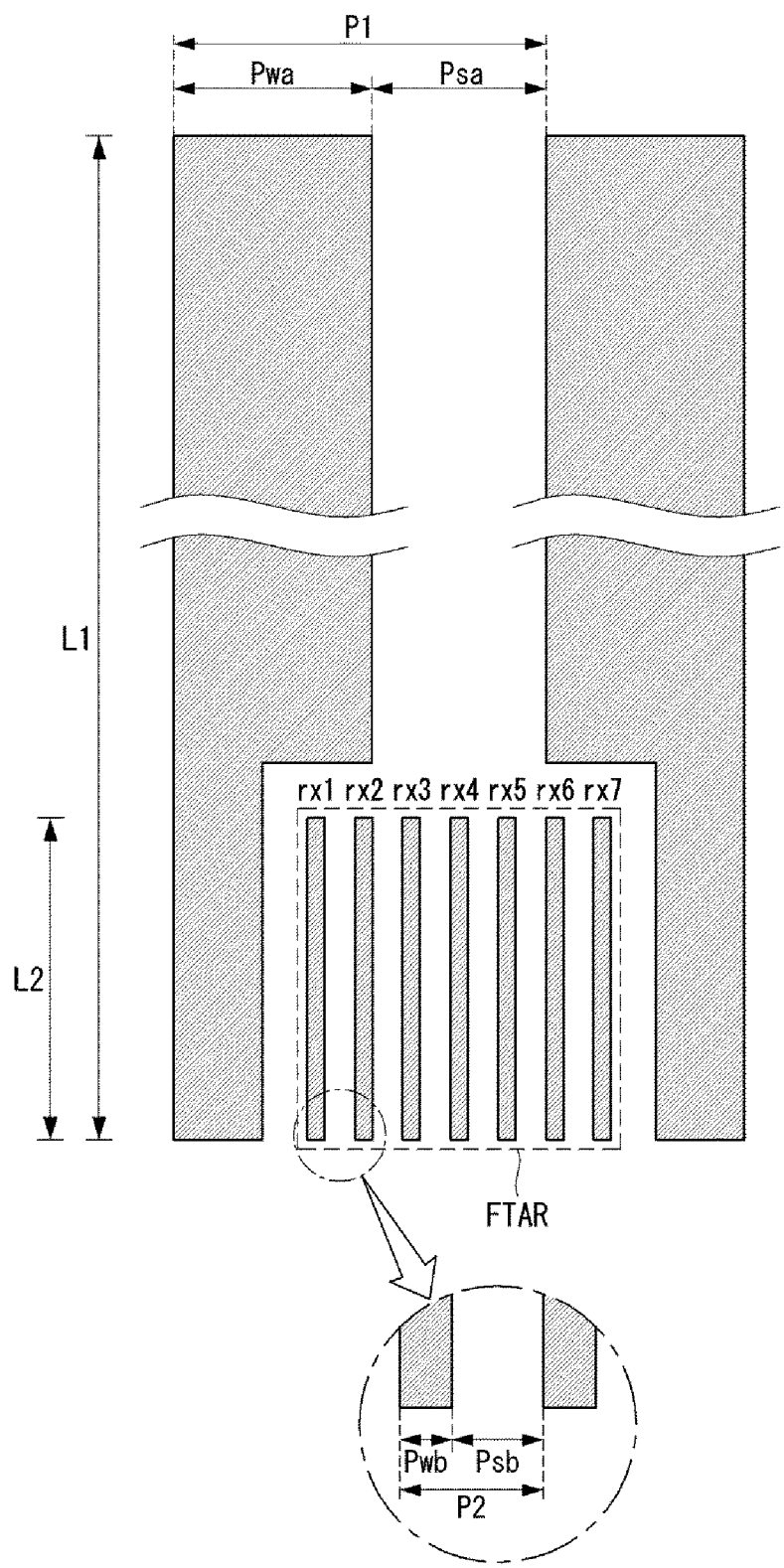
FIGS. 16 and 17 are enlarged views of some of the sensor lines in the fingerprint and touch sensor area of FIG. 15.
Figure 17:
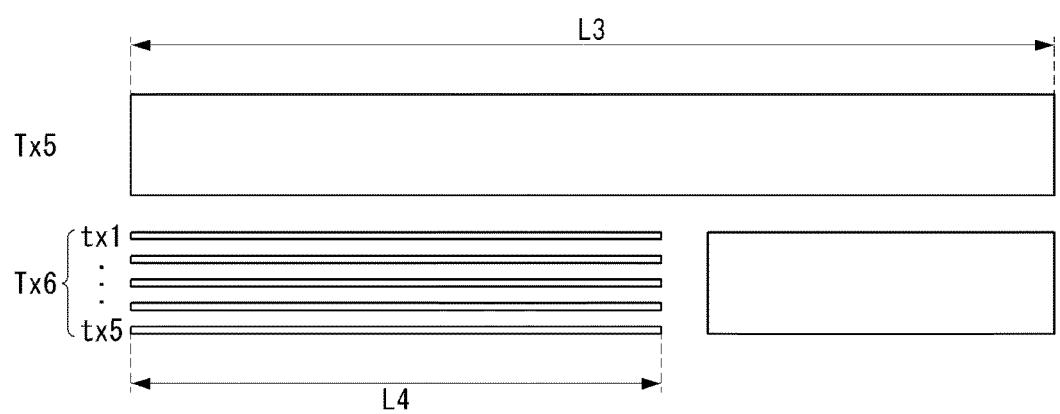

FIG. 15 is a view showing a method of dividing the sensor lines in the fingerprint and touch sensor area according to a first exemplary embodiment of the present disclosure. FIGS. 16 and 17 are enlarged views of some of the sensor lines in the fingerprint and touch sensor area FTAR of FIG. 15. FIG. 16 is an enlarged view of the Rx lines in the fingerprint and touch sensor area FTAR of FIG. 15.

Referring to FIG. 15, the high-density sensor lines in the touch sensor area TAR are grouped and driven in groups through shorting lines 81 and 83. The Rx lines among the high-density sensor lines in the fingerprint and touch sensor area FTAR are separated from the Rx lines in the touch sensor area TAR. The Tx lines in the fingerprint and touch sensor area FTAR are connected to adjacent Tx lines in the touch sensor area TAR.

As more high-density sensor lines are placed in the fingerprint and touch sensor area FTAR, the fingerprint and touch sensor area FTAR between the fingerprint and touch sensor area FTAR and the touch sensor area TAR becomes wider. In this case, to secure a space for the fingerprint and touch sensor area FTAR and the touch sensor area TAR, the part of the Rx line group GPb-Rx in the touch sensor area TAR that is adjacent to the fingerprint and touch sensor area FTAR has a narrower width than the other parts.

Rx channel groups RX are placed between Tx channel groups TX(1) and TX(2) so that the routing lines between the Rx lines of the touchscreen TSP and the Rx channels RX of the touch IC 20 are short. The Tx channel groups TX(1) and TX(2) comprise a plurality of Tx channels that connect the Tx lines in the touch sensor area TAR and fingerprint and touch sensor area FTAR through Tx routing lines 82. The Rx channel groups RX comprise a plurality of Rx channels that connect the Rx lines in the touch sensor area TAR and fingerprint and touch sensor area FTAR through Rx routing lines 84.

To reduce the bezel area where the Tx routing lines 82 are placed, the Tx lines in the touch sensor area TAR may be divided into two and connected to the first channel group TX(1) and second channel group TX(2) of the touch IC 20. For example, odd-numbered Tx line groups may be connected to the Tx channels Tx1, Tx3, . . . , Tx5 placed in the first channel group TX(1) of the touch IC 20. Even-numbered Tx line groups may be connected to the Tx channels Tx2, Tx4, . . . , Tx6 placed in the second channel group TX(2) of the touch IC 20. As a result, embodiments of the present disclosure can reduce any increase in the size of the bezel area since the TX routing lines 82 are distributed along the left and right bezels of the touchscreen TSP.

Referring to FIG. 16, the length L2 of the RX lines rx1 to rx7 in the fingerprint and touch sensor area FTAR is shorter than the length L1 of the Rx lines in the touch sensor area TAR. Accordingly, the capacitance and resistance of the Rx lines rx1 to rx7 in the fingerprint and touch sensor area FTAR can be greatly reduced.

In FIG. 16, the lines that are larger in width belong to an effective channel group ERx in the touch sensor area TAR. P1 denotes the pitch between the Rx lines of the effective channel group ERx, and P2 denotes the pitch between adjacent Rx lines in the fingerprint and touch sensor area FTAR. The pitch P2 between the Rx lines rx1 to rx7 in the fingerprint and touch sensor area FTAR is much smaller than the pitch P1 between the Rx lines of the effective channel group ERx in the touch sensor area TAR. Accordingly, the high-density Rx lines rx1 to rx7 can fit between two effective channel groups ERx in the touch sensor area TAR. For example, P1 may be 4 mm, and P2 may be 10 μm.

In FIG. 16, Pwa denotes the linewidth of one Rx line of the effective channel group ERx, and Psa denotes the spacing between adjacent Rx lines of the effective channel group ERx. Pwb denotes the linewidth of one Rx line in the fingerprint and touch sensor area FTAR, and Psb denotes the spacing between adjacent Rx lines in the fingerprint and touch sensor area FTAR.

In FIG. 17, the lines that are larger in width are the Tx lines in the touch sensor area TAR grouped into groups through a shorting line 81. As shown in FIG. 17, the length of the Tx lines tx1 to tx5 running across the touch sensor area TAR and the fingerprint and touch sensor area FTAR or shared between them is shorter than the length L3 of the Tx lines that exist only in the touch sensor area TAR. Accordingly, the time constant of a sensor driving signal applied to the TX lines in the fingerprint and touch sensor area FTAR in fingerprint recognition mode can be decreased.

The operation according to the embodiment illustrated in FIGS. 15 to 17 is substantially the same as the above-described embodiments. For example, in touch recognition mode TMODE, the touch IC 20 senses touch input by grouping the Tx lines in the touch sensor area TAR and fingerprint and touch sensor area FTAR into groups, supplying a sensor driving signal to the Tx lines, and sensing a change in the electrical charge in the sensors through the RX channels grouped into groups or into effective channel groups. On the other hand, in fingerprint recognition mode, the touch IC 20 senses a fingerprint by individually driving the Tx lines tx1 to tx5 in the fingerprint and touch sensor area FTAR and connecting the RX lines rx1 to rx7 to the Rx channels.

Figure 18:
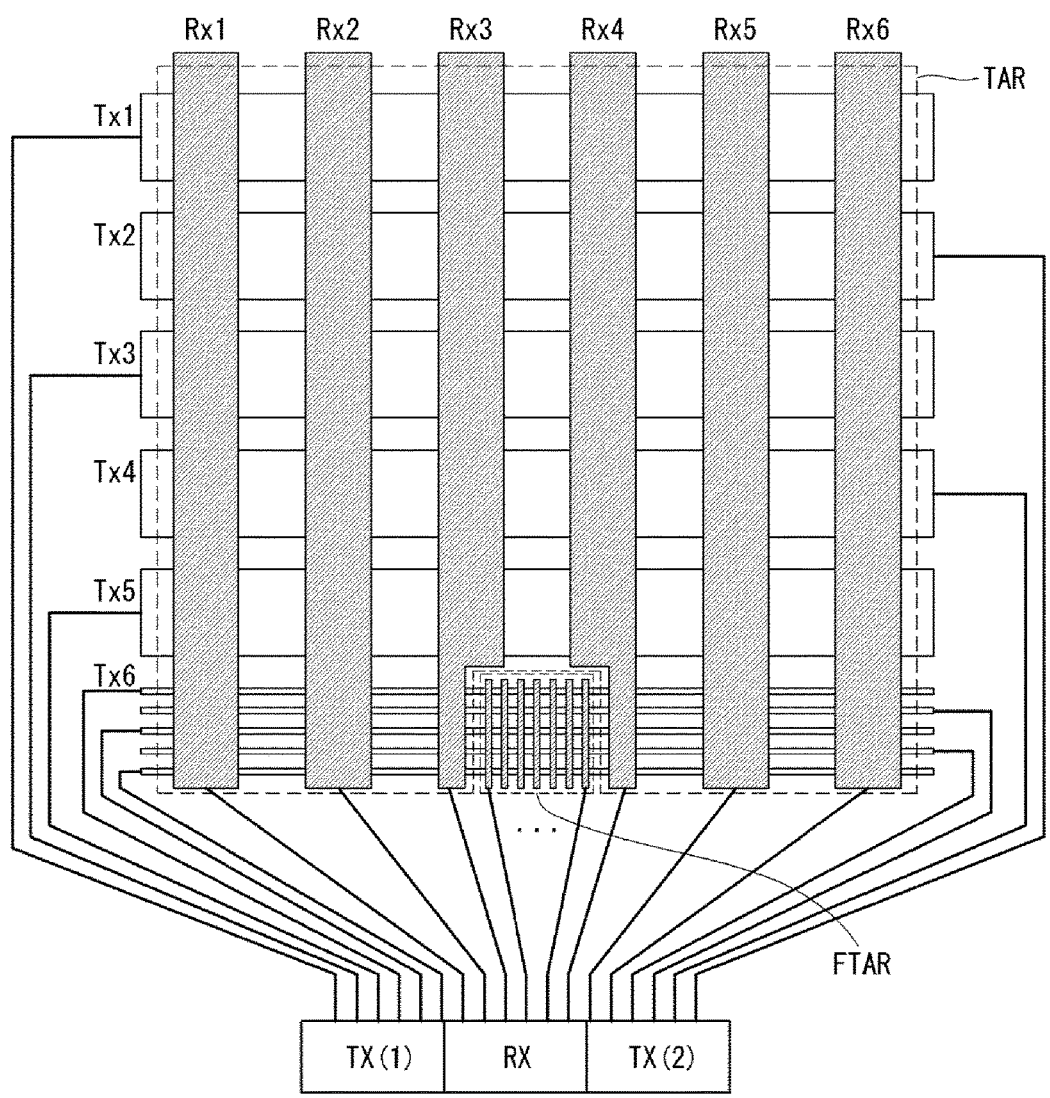
FIG. 18 is a view showing a method of dividing the sensor lines in the fingerprint and touch sensor area according to a second exemplary embodiment of the present disclosure.

FIG. 18 is a view showing a method of dividing the sensor lines in the fingerprint and touch sensor area according to a second exemplary embodiment of the present disclosure.

Referring to FIG. 18, the Rx lines among the high-density sensor lines in the fingerprint and touch sensor area FTAR are separated from the Rx lines in the touch sensor area TAR. Thus, the length of the Rx lines in the fingerprint and touch sensor area FTAR is shorter than the length of the Rx lines in the touch sensor area TAR, which greatly reduces the capacitance and resistance of the Rx lines.

The Tx lines in the fingerprint and touch sensor area FTAR are not separated from the Tx lines in the touch sensor area TaR. Thus, the length of the Tx lines running through the fingerprint and touch sensor area FTAR and the touch sensor area TAR is equal to the length of the Tx lines running through the touch sensor area TAR only.

Rx channel groups Rx are placed between Tx channel groups TX(1) and TX(2) of the touch IC 20 so that the routing lines between the Rx lines of the touchscreen TSP and the Rx channels RX of the touch IC 20 are short.

The Tx lines in the touch sensor area TAR may be divided into two and connected to the first channel group TX(1) and second channel group TX(2) of the touch IC 20. For example, odd-numbered Tx line groups may be connected to the Tx channels placed in the first channel group TX(1) of the touch IC 20. Even-numbered Tx line groups may be connected to the Tx channels placed in the second channel group TX(2) of the touch IC 20. As a result, embodiments of the present disclosure can reduce any increase in the size of the bezel area since the TX routing lines 82 are distributed along the left and right bezels of the touchscreen TSP.

In touch recognition mode TMODE, the touch IC 20 senses touch input by grouping the Tx lines in the touch sensor area TAR and fingerprint and touch sensor area FTAR into groups, supplying a sensor driving signal to the Tx lines, and sensing a change in the electrical charge in the sensors through the RX channels grouped into groups or into effective channel groups. On the other hand, in fingerprint recognition mode, the touch IC 20 senses a fingerprint by individually driving the Tx lines tx1 to tx5 in the fingerprint and touch sensor area FTAR and connecting the RX lines rx1 to rx7 to the Rx channels.

Figure 19:
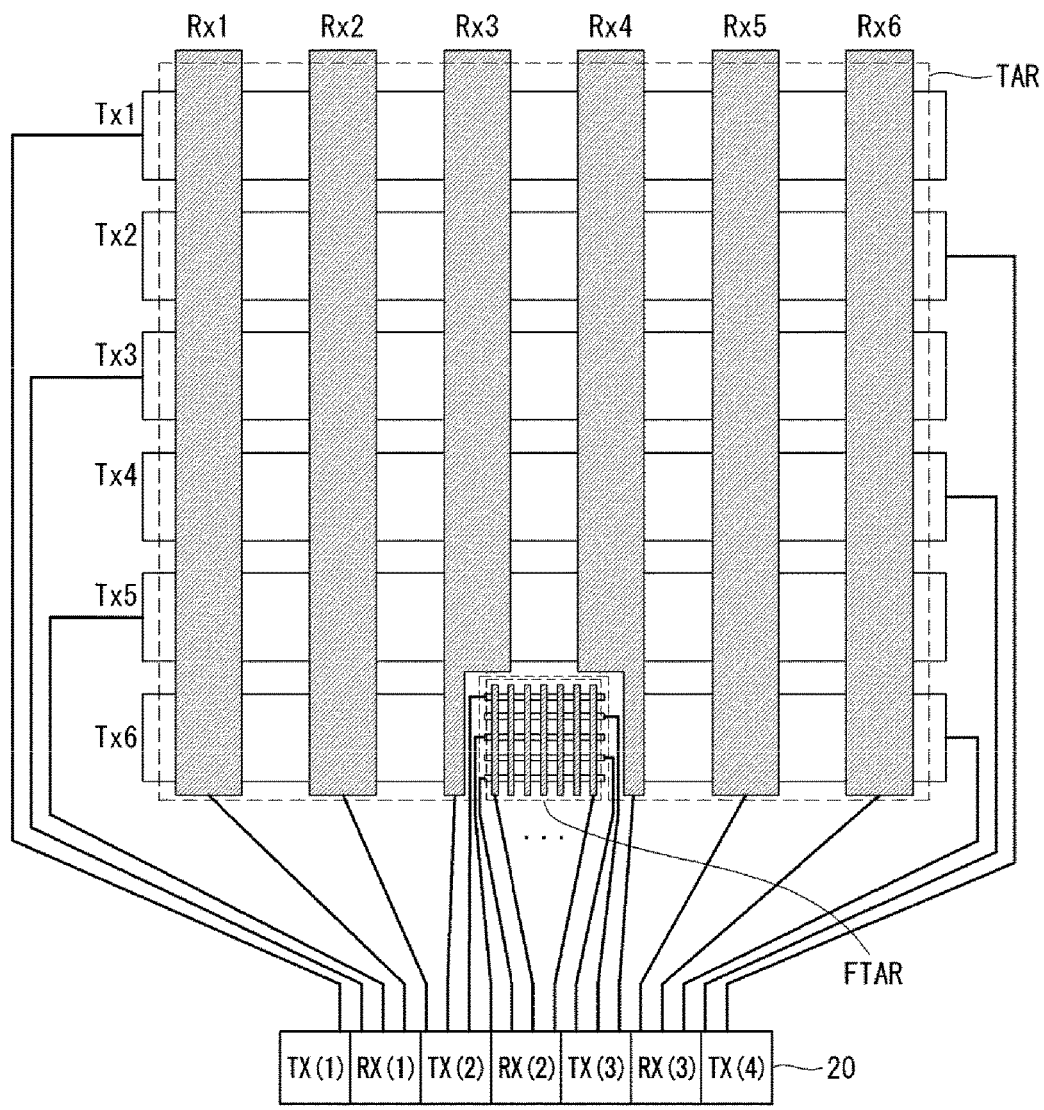
FIGS. 19 and 20 are views showing a method of dividing the sensor lines in the fingerprint and touch sensor area according to a third exemplary embodiment of the present disclosure.
Figure 20:
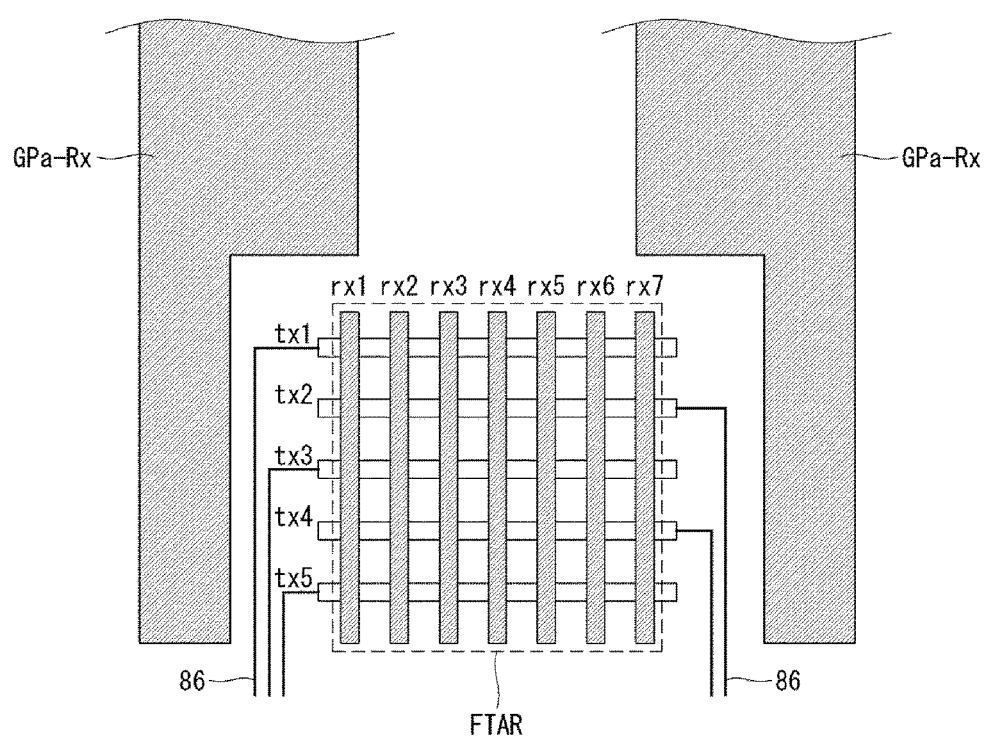
Figure 21:
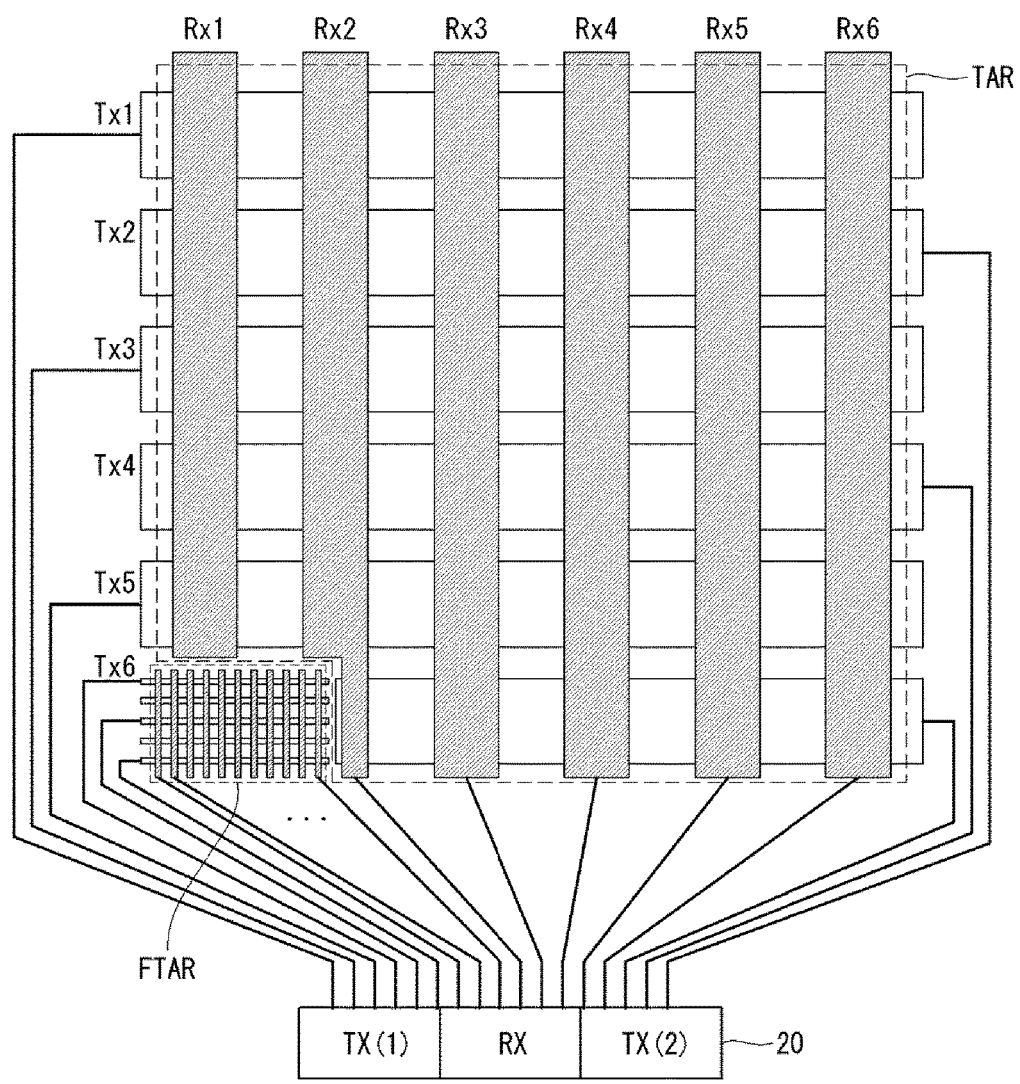
FIGS. 21 to 26 are views showing methods of dividing the sensor lines in the fingerprint and touch sensor area according to other exemplary embodiments of the present disclosure.

FIGS. 19 and 20 are views showing a method of dividing the sensor lines in the fingerprint and touch sensor area according to a third exemplary embodiment of the present disclosure. FIG. 20 is an enlarged view of the fingerprint and touch sensor area FTAR of FIG. 19 and its surrounding area.

Referring to FIGS. 19 and 20, the Rx lines in the fingerprint and touch sensor area FTAR are separated from the Rx lines in the touch sensor area TAR. Also, the TX lines in the fingerprint and touch sensor area FTAR are separated from the Tx lines in the touch sensor area TAR. Thus, the length of the Rx lines rx1 to rx7 in the fingerprint and touch sensor area FTAR is shorter than the length of the Rx lines in the touch sensor area TAR, which greatly reduces the capacitance and resistance of the Rx lines rx1 to rx7.

The Tx lines tx1 to tx5 in the fingerprint and touch sensor area FTAR are separated from the Tx lines adjacent to the left and right sides of the fingerprint and touch sensor area FTAR. Accordingly, the time constant of a sensor driving signal applied to the Tx lines in the fingerprint and touch sensor area FTAR in fingerprint recognition mode can be decreased.

Tx routing lines 86 connecting the Tx lines tx1 to tx5 and the Tx channels of the touch IC 20 are placed in the space between the fingerprint and touch sensor area FTAR and the touch sensor area TAR. To secure this space, the part of the Rx line group GPb-Rx in the touch sensor area TAR that is adjacent to the fingerprint and touch sensor area FTAR has a narrower width than the other parts.

Tx channel groups TX(1), TX(2), TX(3), and TX(4) and Rx channel groups RX(1), RX(2), and RX(3) of the touch IC 20 are placed in such a way that the Rx lines in the fingerprint and touch sensor area FTAR are connected to the Rx channels RX of the touch IC 20 in the shortest distance possible. To this end, the Rx channel group RX(2), among the Tx and Rx channels of the touch IC 20, are placed closest to the fingerprint and touch sensor area FTAR. As shown in FIG. 18, if the fingerprint and touch sensor area FTAR is placed in the center or bottom center of the touchscreen TSP, the Rx channel groups RX each are placed between the Tx channel groups TX(1), TX(2), T(3), and T(4) of the touch IC 20.

In touch recognition mode TMODE, the touch IC 20 senses touch input by grouping the Tx lines in the touch sensor area TAR and fingerprint and touch sensor area FTAR into groups, supplying a sensor driving signal to the Tx lines, and sensing a change in the electrical charge in the sensors through the RX channels grouped into groups or into effective channel groups. On the other hand, in fingerprint recognition mode, the touch IC 20 senses a fingerprint by individually driving the Tx lines tx1 to tx5 in the fingerprint and touch sensor area FTAR and connecting the RX lines rx1 to rx7 to the Rx channels.

Figure 22:
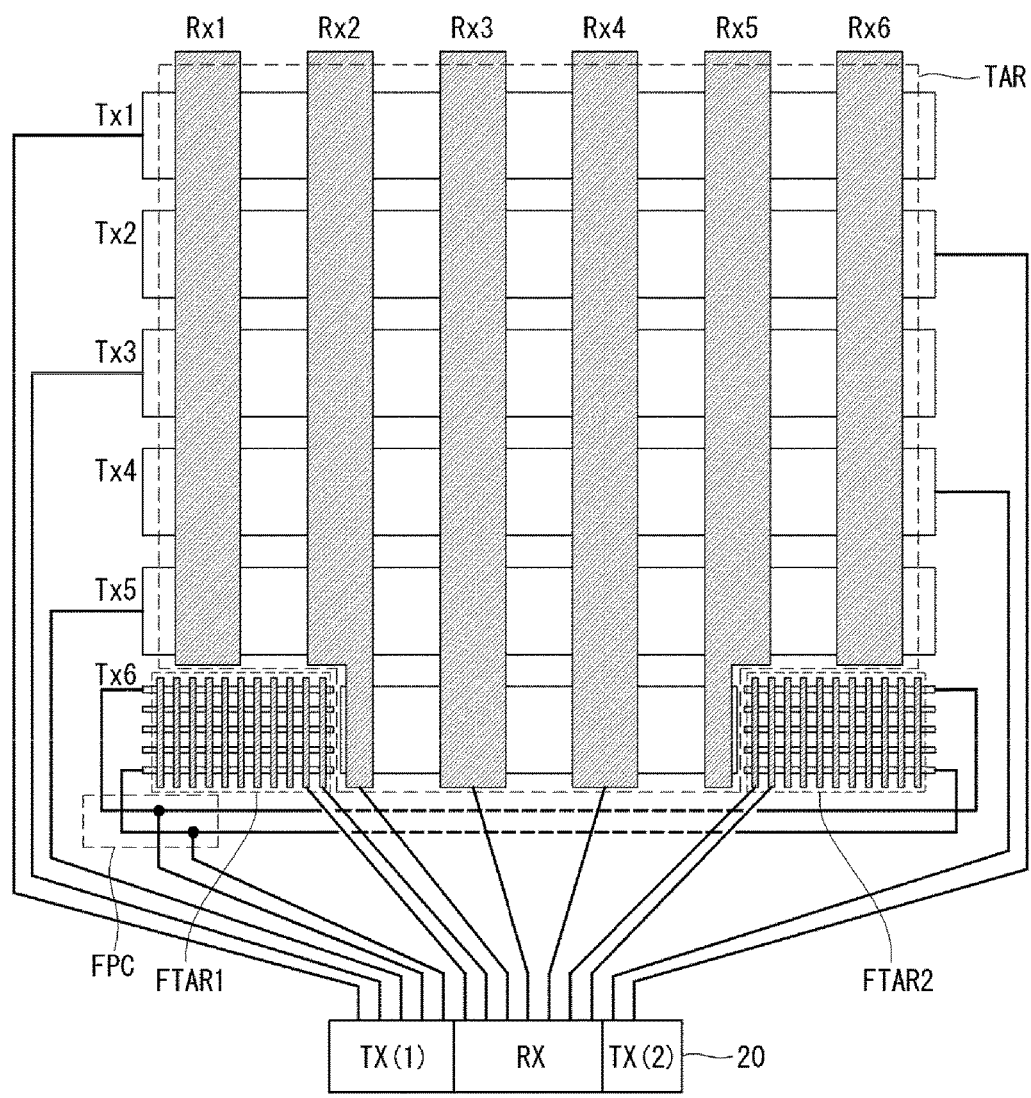
Figure 23:
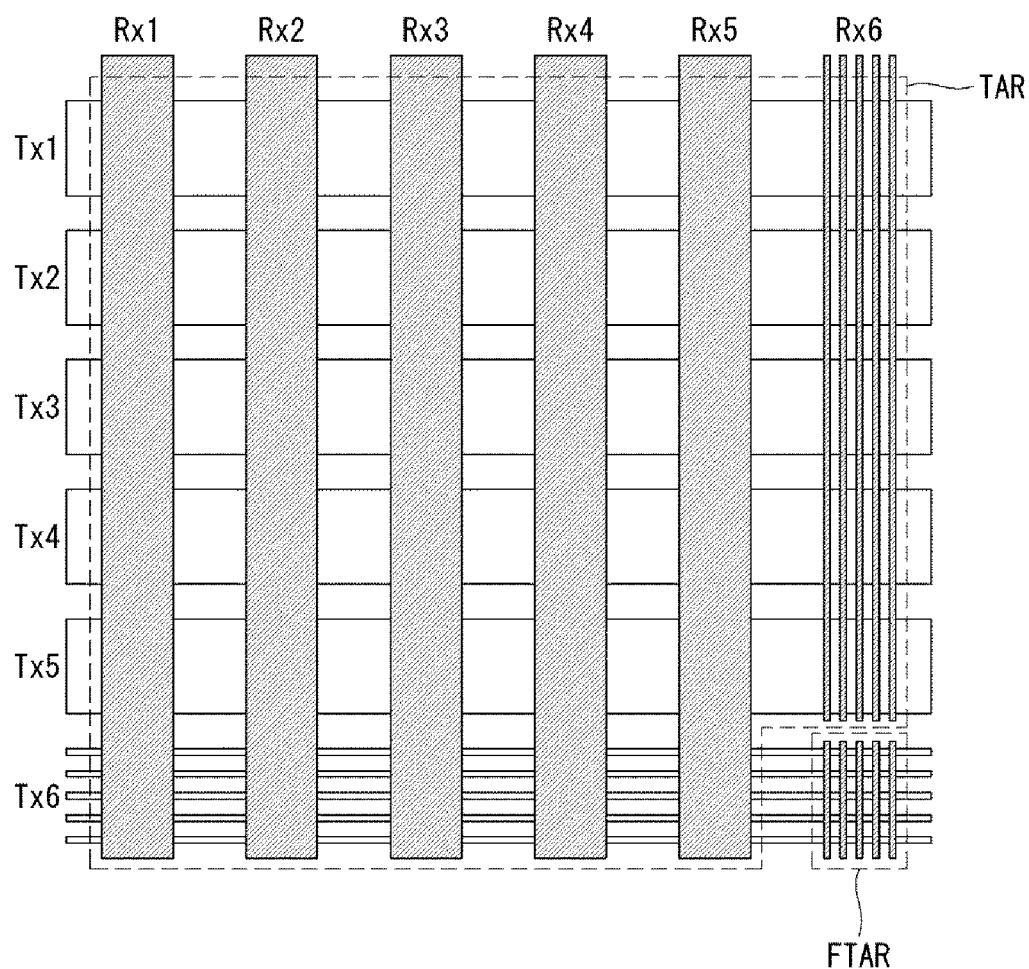
Figure 24:
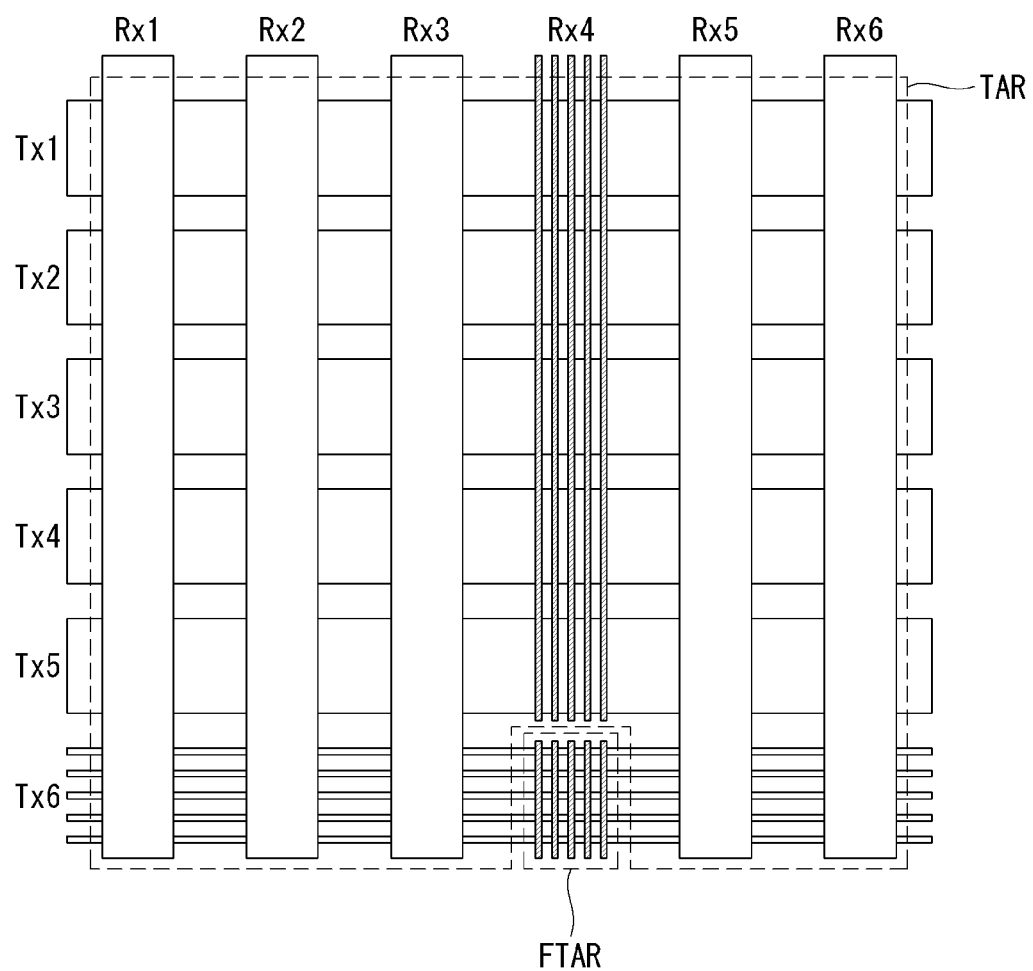
Figure 25:
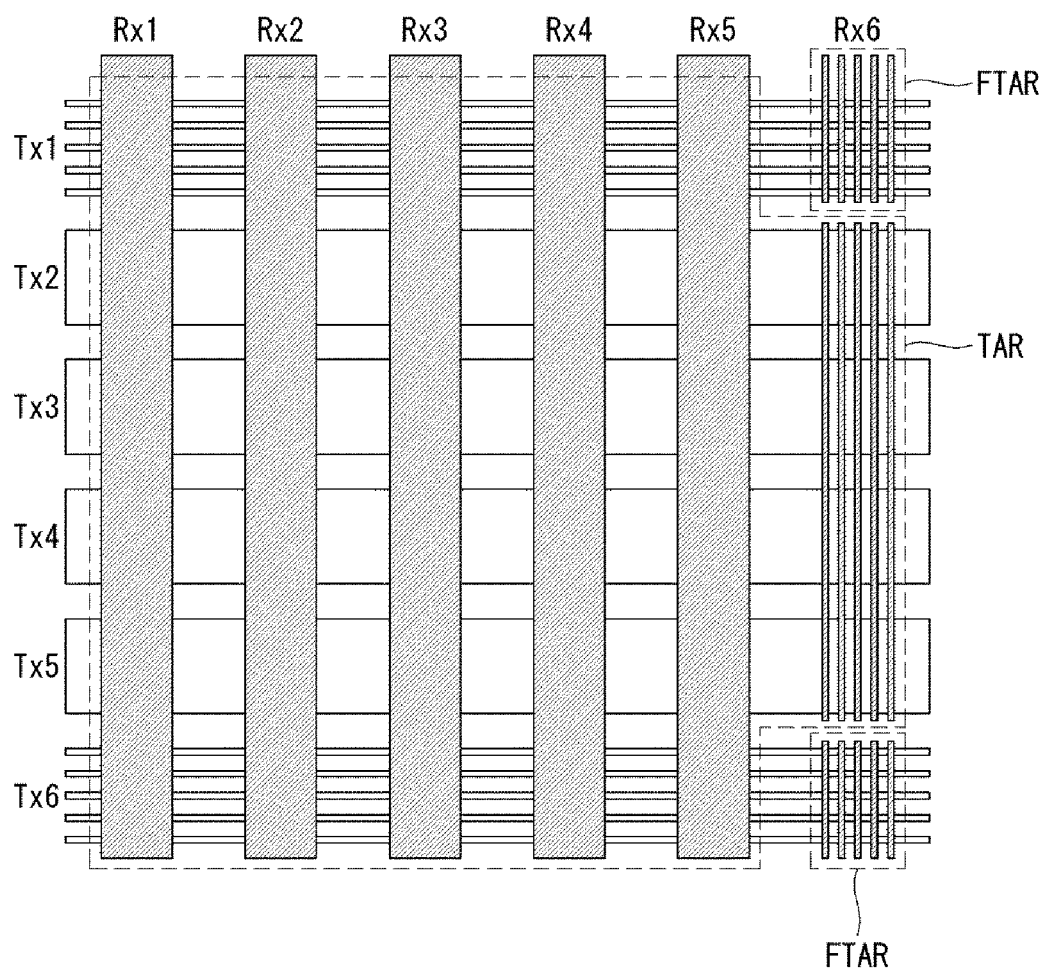
Figure 26:
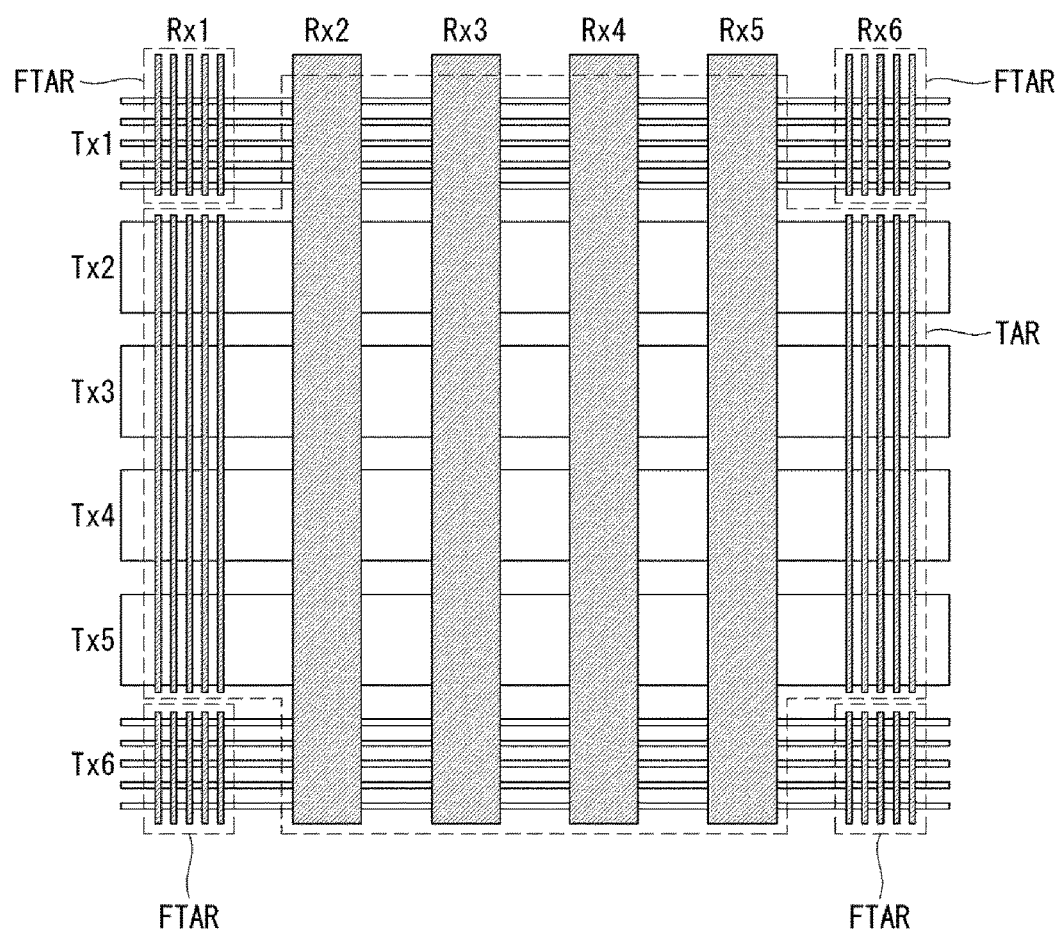

The above-described embodiments may be modified in various ways as shown in FIGS. 21 to 26. For example, one or more fingerprint and touch sensor areas FTAR may be placed in the corner of the touchscreen TSP. As shown in FIG. 22, the Tx lines in first and second fingerprint and touch sensor areas FTAR1 and FTAR2 separated with the touch sensor area TAR in between may be connected to a parallel routing line. On an FPC flexible printed circuit, the parallel routing line may be branched off into two. In the embodiments illustrated in FIGS. 21 to 26, the Rx lines in the fingerprint and touch sensor area FTAR are separated from their adjacent Rx lines in the touch sensor area TAR. In addition, the Tx lines in the fingerprint and touch sensor area FTAR also may be separated from the Tx lines in the touch sensor area TAR.

Figure 27:
FIG. 27 is a view showing the arrangement of Rx and Tx channel groups in a touch IC according to an exemplary embodiment of the present disclosure.
Figure 27:
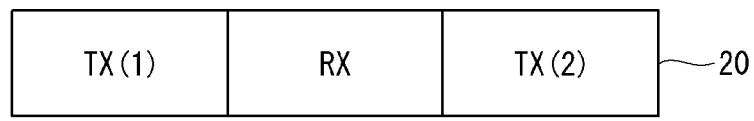
Figure 28:
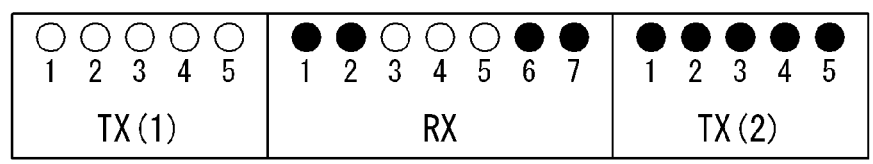
FIG. 28 is a view showing an example of Tx and Rx channel pins in a touch IC according to an exemplary embodiment of the present disclosure.

In the present disclosure, the high-density sensors in the fingerprint and touch sensor area FTAR and touch sensor area TAR are driven by a single touch IC 20. In the touch IC 20, Rx channel groups RX(1), RX(2), and RX and Tx channel groups TX(1), TX(2), and TX may be alternately arranged, as shown in FIGS. 27 and 28. The RX channel group RX may be arranged between adjacent TX channel groups TX(1) and TX(2), or the Tx channel group TX may be arranged between adjacent RX channel groups RX(1) and RX(2).

Figure 29:
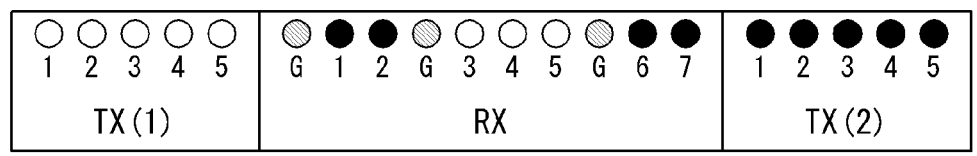
FIG. 29 is a view showing an example in which ground pins are placed between the TX and Rx channel pins in the touch IC.

FIG. 28 is a view showing an example of Tx and Rx channel pins in the touch IC 20. FIG. 29 is a view showing an example in which ground pins are placed between the TX and Rx channel pins in the touch IC.

Referring to FIGS. 28 and 29, the touch IC 20 comprises TX channel pins connected to Tx channels and Rx channels on a 1:1 basis. In the drawings, the numbers in the touch IC 20 indicate pin numbers.

Pins 1 to 5 in the first Tx channel group TX(1) may be connected to the Tx lines in the fingerprint and touch sensor area FTAR. Pins 1 to 5 in the second Tx channel group TX(2) may be connected to the Tx lines in the touch sensor area TAR. Pins 1 to 7 in the Rx channel group RX may be connected to the Rx lines in the touch sensor area TAR and fingerprint and touch sensor area FTAR.

In touch recognition mode, the touch IC 20 sequentially outputs a sensor driving signal through the first to fifth pins in the second Tx channel group TX(2), and sequentially supplies the sensor driving signal to groups of Tx lines in the touch sensor area TAR. Then, in touch recognition mode, the touch IC 20 outputs a sensor driving signal simultaneously through the first to fifth pins in the first Tx channel group TX(1) and drives the Tx lines in the fingerprint and touch sensor area FTAR all at once, as if in one group. In touch recognition mode, the touch IC 20 receives sensor signals from the Rx lines corresponding to the effective channels ERx through the third to fifth pins in the Rx channel group RX, in synchronization with the sensor driving signal applied to the groups of Tx lines, and senses touch input on the touch sensor area TAR and fingerprint and touch sensor area FTAR without a dead zone, based on a change in the electrical charge in the sensors.

In fingerprint recognition mode, the touch IC 20 sequentially supplies a sensor driving signal to the Tx lines in the fingerprint and touch sensor area FTAR through the first to fifth pins in the first Tx channel group TX(1) and scans the fingerprint and touch sensor area FTAR line by line. Then, in fingerprint recognition mode, the touch IC sequentially receives sensor signals of the high-density sensors from the Rx lines in the effective channel groups ERx through the first to fifth pins in the Rx channel group RX, in synchronization with the sensor driving signal, and senses the user's fingerprint.

Because of the sensor driving signal, the voltage of the pins connected to the Tx channels is higher than the voltage of the pins connected to the Rx channels. As such, if the Tx channel pins and the Rx channel pins are close to each other, the parasitic capacitance between them may cause a change in the sensor signals received through the Rx channels due to coupling. To avoid this problem, the pins G (hereinafter, "ground pins") in the Rx channel group Rx, close to the Tx channels, as shown in FIG. 29, may be supplied with a ground voltage, put into a floating state, or supplied with a constant direct-current voltage. These ground pins are placed not only in the Rx channel group RX. For example, the ground pins may be configured as one or more pins that exist between effective pins in the TX channel groups TX(1) and TX(2) connected to the Tx lines and effective pins in the RX channel group RX connected to the Rx lines.

The capacitance connected to the Rx lines in the touch sensor area TAR and the capacitance connected to the Rx lines in the fingerprint and touch sensor area FTAR may have different values. In this case, as shown in FIG. 29, the voltage of the pins 1, 2, 6, and 7 in the Rx channel group RX connected to the RX lines in the touch sensor area TAR and the voltage of the pins 3 to 5 connected to the Rx lines in the fingerprint and touch sensor area FTAR may be different. Unwanted coupling between adjacent pins adds noise to received signals in the Rx channels. To reduce the coupling between the pins 1, 2, 6, and 7 connected to the Rx lines in the touch sensor area TAR and the pins 3 to 5 connected to the Rx lines in the fingerprint and touch sensor area FTAR, one or more ground pins G may be placed in between.

The ground pins G may be connected to non-driven RX lines in ineffective channels NRx or non-driven Tx lines (see FIG. 33) placed between adjacent Tx line groups.

Figure 30:
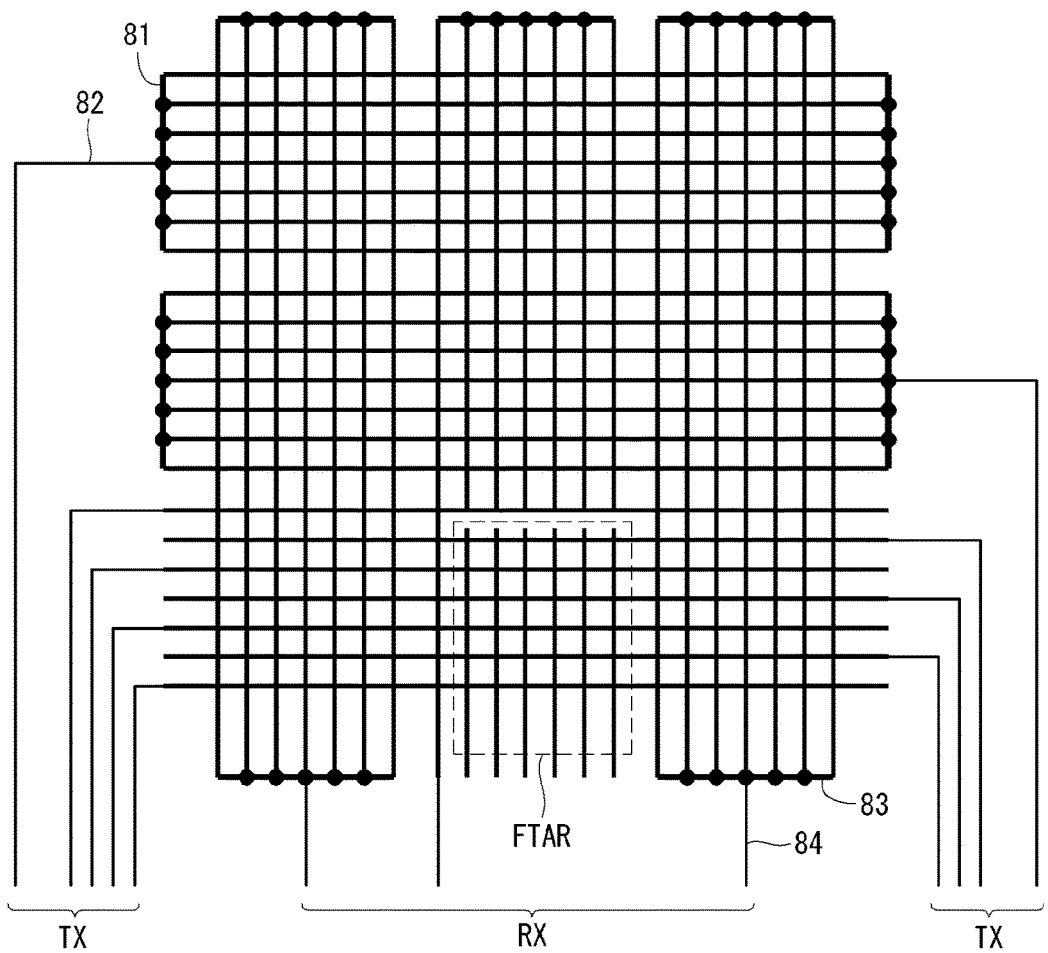
FIGS. 30 and 31 are views showing various embodiments of shorting lines for connecting sensor lines.
Figure 31:
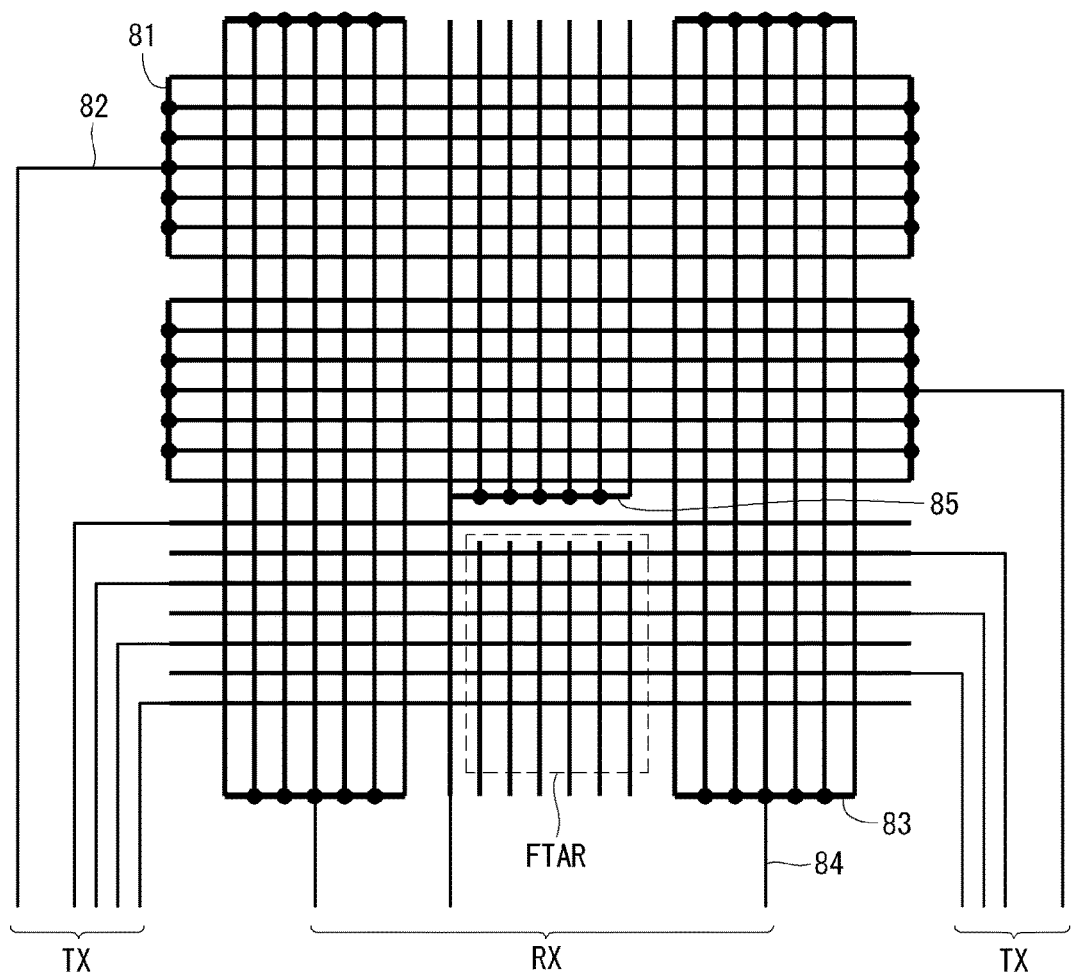

FIGS. 30 and 31 show shorting lines 81 and 83 for driving high-density sensor lines in groups, in which the sensor lines with the same pitch are formed in the touch sensor area TAR and the fingerprint and touch sensor area FTAR. As shown in FIG. 30, the shorting lines 81 and 83 may be placed on the periphery of the sensor array and connect the sensor lines. Also, as shown in FIG. 31, one or more shorting lines 85 may be placed within the sensor array.

Figure 32:
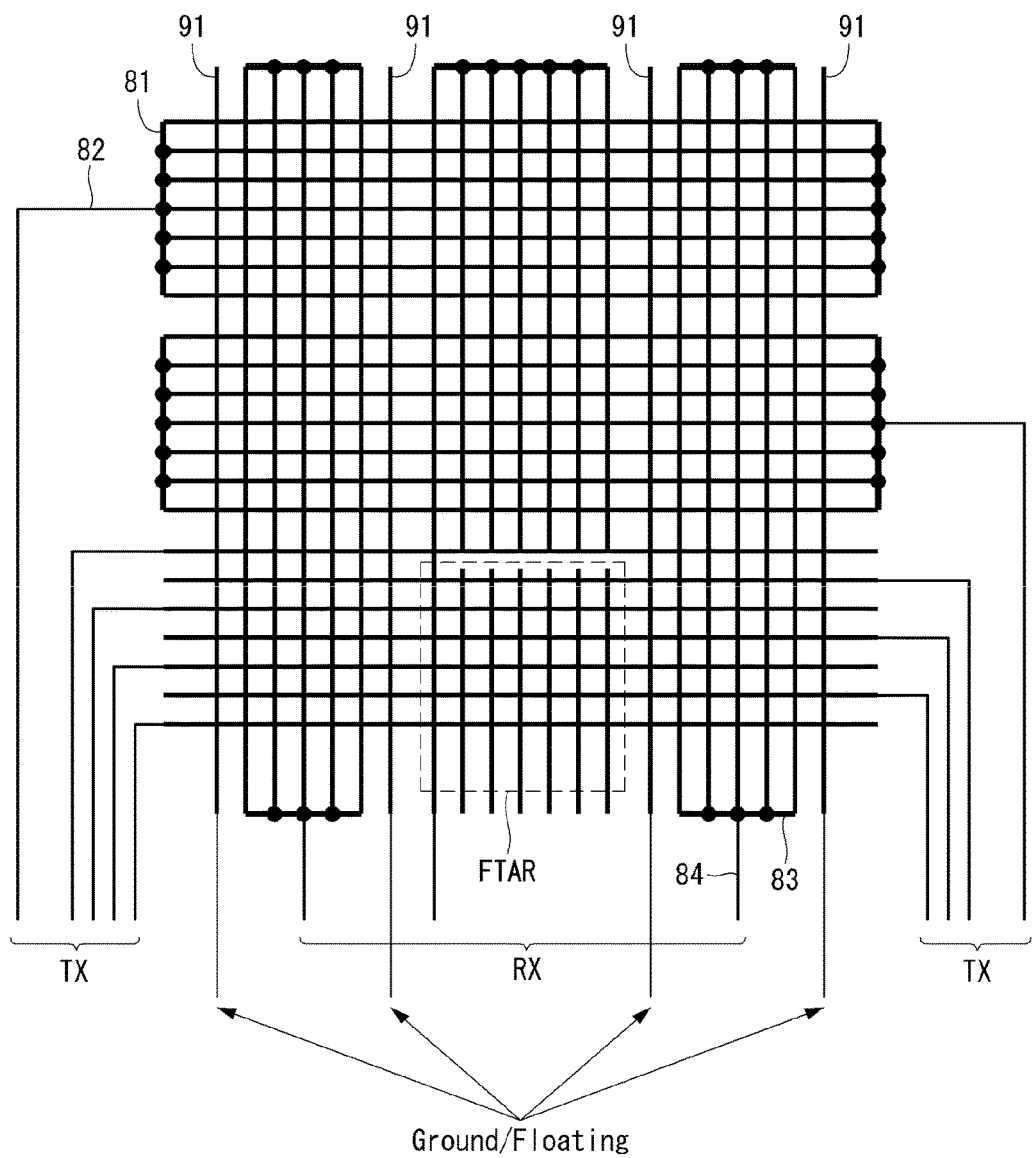

FIGS. 32 and 33 are views showing various embodiments of non-driven sensor lines.

Referring to FIGS. 32 and 33, non-driven sensor lines 91 comprise non-driven Rx lines in ineffective channels NRx. The non-driven sensor lines 91 may further comprise non-driven Tx lines placed between adjacent Tx line groups. These non-driven sensor lines 91 can reduce the capacitance connected to the sensor lines. The non-driven sensor lines 91 may be grounded or put into a floating state.

As discussed above, embodiments of the present disclosure can reduce the capacitance and resistance connected to the sensor lines by separating at least some of the sensor lines in the fingerprint and touch sensor area FTAR from the sensor lines in the touch sensor area TAR. Moreover, embodiments of the present disclosure can improve sensing sensitivity by decreasing the time constant of a sensor driving signal. Furthermore, embodiments of the present disclosure can further reduce the capacitance of the sensor lines by grounding some of the high-density sensor lines or putting them into a floating state.

Additionally, embodiments of the present disclosure allows for implementation of both a touch recognition function and a fingerprint recognition function in the screen's display area, and therefore can sense touch input across the entire sensor array without a dead zone in the screen area, where touch cannot be recognized, and improve sensing sensitivity by continuously sensing touch trajectories.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A fingerprint sensor integrated type touchscreen device, comprising:
    a sensor array including sensors disposed in a touch sensor area and in a fingerprint and touch sensor area, and sensor lines respectively coupled to the sensors in the touch sensor area and to the sensors in the fingerprint and touch sensor area, the sensor lines including Tx lines to which sensor driving signals are applied and Rx lines that extend in a direction transverse to the Tx lines; and
    a touch integrated circuit (IC) that is coupled to the sensor lines in the touch sensor area and the fingerprint and touch sensor area and that senses a touch input in a touch recognition mode, based on a change in sensor signals received from the touch sensor area and the fingerprint and touch sensor area, and senses a fingerprint in a fingerprint recognition mode, based on a change in sensor signals received from the fingerprint and touch sensor area, the touch IC including a switch array having a plurality of first switches and a plurality of second switches, all of the Rx lines in the fingerprint and touch sensor area being electrically coupled to respective ones of the first switches, all of the Rx lines in the fingerprint and touch sensor area being electrically coupled to respective ones of the second switches,
    wherein, in the touch recognition mode, the plurality of second switches electrically connects a portion of the Rx lines in the fingerprint and touch sensor area to a touch sensing circuit, and in the fingerprint recognition mode, the plurality of first switches electrically connects all of the Rx lines in the fingerprint and touch sensor area to respective fingerprint sensing circuits, the portion of the Rx lines in the fingerprint and touch sensor area being fewer in number than all of the Rx lines in the fingerprint and touch sensor area,
    wherein all of the Rx lines in the fingerprint and touch sensor area are separated from the Rx lines in the touch sensor area.

2. The fingerprint sensor integrated type touchscreen device of claim 1, wherein the Tx lines are grouped into Tx line groups through a first shorting line, and at least some of the Rx lines are grouped into effective channel groups.

3. The fingerprint sensor integrated type touchscreen device of claim 2, wherein the sensor lines in the touch sensor area and fingerprint and touch sensor area include one or more non-driven Tx lines positioned between adjacent Tx line groups that are put into a floating or grounded state.

4. The fingerprint sensor integrated type touchscreen device of claim 2, wherein the sensor lines in the touch sensor area and fingerprint and touch sensor area include one or more non-driven Rx lines that are put into a floating or grounded state.

5. The fingerprint sensor integrated type touchscreen device of claim 4, wherein the sensor lines in the touch sensor area and fingerprint and touch sensor area include one or more non-driven Tx lines positioned between adjacent Tx line groups that are put into a floating or grounded state.

6. The fingerprint sensor integrated type touchscreen device of claim 2, wherein Tx lines positioned in the fingerprint and touch sensor area are separated from adjacent Tx lines positioned in the touch sensor area.

7. The fingerprint sensor integrated type touchscreen device of claim 6, wherein all of the Tx lines positioned in the fingerprint and touch sensor area are separated from the adjacent Tx lines positioned in the touch sensor area.

8. The fingerprint sensor integrated type touchscreen device of claim 6, wherein the touch IC comprises:
    one or more Rx channel groups having Rx channels connected to the Rx lines; and
    one or more Tx channel groups having Tx channels connected to the Tx lines,
    wherein the Rx channel groups are positioned between the Tx channel groups.

9. The fingerprint sensor integrated type touchscreen device of claim 8, wherein the touch IC includes a plurality of pins, wherein one or more of the pins that are connected to the Rx channels of the Rx channel groups, adjacent to the Tx channel groups, are put into a floating or grounded state.

10. The fingerprint sensor integrated type touchscreen device of claim 8, wherein the touch IC includes a plurality of pins, wherein one or more of the pins that are connected to the Rx channels of the Rx channel groups, placed between the pins connected to the Rx lines in the fingerprint and touch sensor area and the pins connected to the Rx lines in the touch sensor area, are put into a floating or grounded state.

11. The fingerprint sensor integrated type touchscreen device of claim 1, wherein the touch IC comprises:
    one or more Rx channel groups having Rx channels connected to the Rx lines; and
    one or more Tx channel groups having Tx channels connected to the Tx lines,
    wherein the Rx channel groups are positioned between the Tx channel groups.

12. The fingerprint sensor integrated type touchscreen device of claim 11, wherein the touch IC includes a plurality of pins, wherein one or more of the pins that are connected to the Rx channels of the Rx channel groups, adjacent to the Tx channel groups, and are put into a floating or grounded state.

13. The fingerprint sensor integrated type touchscreen device of claim 11, wherein the touch IC includes a plurality of pins, wherein one or more of the pins that are connected to the Rx channels of the Rx channel groups, placed between the pins connected to the Rx lines in the fingerprint and touch sensor area and the pins connected to the Rx lines in the touch sensor area, are put into a floating or grounded state.

14. The fingerprint sensor integrated type touchscreen device of claim 1 wherein all of the Rx lines in the fingerprint and touch sensor area are electrically separated from the Rx lines in the touch sensor area.

15. The fingerprint sensor integrated type touchscreen device of claim 1 wherein the touch IC is configured to receive a touch enable signal and a fingerprint enable signal, the plurality of second switches being configured to electrically connect the portion of the Rx lines in the fingerprint and touch sensor area to the touch sensing circuit based on the touch enable signal, and the plurality of first switches being configured to electrically connect all of the Rx lines in the fingerprint and touch sensor area to the respective fingerprint sensing circuits based on the fingerprint enable signal.

16. A fingerprint sensor integrated type touchscreen device, comprising:
 a sensor array including sensors disposed in a touch sensor area and in a fingerprint and touch sensor area, and sensor lines respectively coupled to the sensors in the touch sensor area and to the sensors in the fingerprint and touch sensor area, the sensor lines including:
  a plurality of first Tx lines positioned in the touch sensor area, the first TX lines extend in a first direction;
  a plurality of first Rx lines positioned in only the touch sensor area, the first Rx lines extend in a second direction that is transverse to the first direction;
  a plurality of second Tx lines positioned in the fingerprint and touch sensor area, the second Tx lines extend in the first direction; and
  a plurality of second Rx lines positioned in only the fingerprint and touch sensor area, the second Rx lines extend in the second direction; and
 a touch integrated circuit (IC) that is coupled to the sensor lines in the touch sensor area and the fingerprint and touch sensor area and that senses a touch input in a touch recognition mode, based on a change in sensor signals received from the touch sensor area and the fingerprint and touch sensor area, and senses a fingerprint in a fingerprint recognition mode, based on a change in sensor signals received from the fingerprint and touch sensor area, the touch IC including a switch array having a plurality of first switches and a plurality of second switches, all of the second Rx lines being electrically coupled to respective ones of the first switches, all of the second Rx lines being electrically coupled to respective ones of the second switches,
 wherein, in the touch recognition mode, the plurality of second switches electrically connects a portion of the second Rx lines to a touch sensing circuit, and in the fingerprint recognition mode, the plurality of first switches electrically connects all of the second Rx lines to respective fingerprint sensing circuits, the portion of the second Rx lines being fewer in number than all of the second Rx lines.

17. The fingerprint sensor integrated type touchscreen device of claim 16 wherein at least one of the first Tx lines in the touch sensor area is coupled to a respective one of the second Tx lines in the fingerprint and touch sensor area.

18. The fingerprint sensor integrated type touchscreen device of claim 16 wherein the first Tx lines are positioned in only the touch sensor area, and the second Tx lines are positioned in only the fingerprint and touch sensor area.

19. The fingerprint sensor integrated type touchscreen device of claim 16 wherein the touch IC is configured to receive a touch enable signal and a fingerprint enable signal, the plurality of second switches being configured to electrically connect the portion of the second Rx lines to the touch sensing circuit based on the touch enable signal, and the plurality of first switches being configured to electrically connect all of the second Rx lines to the respective fingerprint sensing circuits based on the fingerprint enable signal.

\* \* \* \* \*